United States Patent
Yoshimatsu

(10) Patent No.: US 6,326,994 B1
(45) Date of Patent: *Dec. 4, 2001

(54) MATCHED FIELD-OF-VIEW STEREOGRAPHIC IMAGING APPARATUS

(75) Inventor: Hiroshi Yoshimatsu, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/010,376

(22) Filed: Jan. 21, 1998

(30) Foreign Application Priority Data

Jan. 22, 1997 (JP) .................................. 9-009377

(51) Int. Cl.[7] .......................... H04N 13/02; H04N 5/225
(52) U.S. Cl. ................................. 348/46; 348/169
(58) Field of Search ....................... 348/46, 169, 39, 348/159, 157, 57; 382/190, 103

(56) References Cited

U.S. PATENT DOCUMENTS

| | | | |
|---|---|---|---|
| 3,858,001 | * 12/1974 | Bonne | 348/57 |
| 3,876,308 | * 4/1975 | Alpers | 348/169 |
| 4,851,905 | * 7/1989 | Pryor | 348/169 |
| 5,130,794 | * 7/1992 | Ritchey | 348/39 |
| 5,434,617 | * 7/1995 | Bianchi | 348/169 |
| 5,581,276 | * 12/1996 | Cipolla et al. | 382/90 |
| 5,598,208 | * 1/1997 | McClintock | 348/159 |
| 5,912,980 | * 6/1999 | Hunke | 382/103 |
| 5,923,365 | * 7/1999 | Tamir et al. | 348/169 |
| 5,953,056 | * 9/1999 | Tucker | 348/157 |
| 6,173,066 | * 1/2001 | Peurach et al. | 382/103 |

* cited by examiner

Primary Examiner—Chris Kelley
Assistant Examiner—Allen Wong
(74) Attorney, Agent, or Firm—Frommer Lawrence & Haug LLP; William S. Frommer; Darren M. Simon

(57) ABSTRACT

An apparatus for receiving image information is provided, having a plurality of imaging devices following an object with a simple mechanism and providing realistic three-dimensional image display with less fatigue of a viewer. A controller specifies an object of imaging based on images captured by first and second cameras and controls a pan-and-tilt to allow a field of view of the first camera to track the object. The controller performs pattern matching using the images captured by the two cameras and controls another pan-and-tilt to allow a field of view of the second camera to follow the object of the first camera.

1 Claim, 18 Drawing Sheets

MATCHED FIELD-OF-VIEW STEREOGRAPHIC IMAGING APPARATUS

BACKGROUND OF THE INVENTION

1. Field of the Invention

The present invention relates to an apparatus for receiving image information for capturing images of an object by a plurality of imaging means to obtain image information. The invention also relates to a method of receiving image information for capturing images of an object by a plurality of imaging means to obtain image information.

2. Description of the Related Art

Considerable research and development has been carried out on three-dimensional image display techniques using a head-mounted display and a head-up display and so on for applications such as virtual reality and games.

In order to display a three-dimensional image of an object in general, image information obtained through acquiring images of the object from directions differing from one another is given to each of right and left eyes of a person. Therefore displaying a three-dimensional image of the object requires a plurality of imaging devices for capturing images of the object from directions differing from one another and a display for displaying a three-dimensional image of the object based on the image information obtained by the plurality of imaging devices.

For displaying a three-dimensional image of an object in motion, it is required that the plurality of imaging devices follow the object in motion. A conventional technique for providing a plurality of imaging devices following an object in motion is described in Shigeru Ando, 'Real-time Three-dimensional Vision Sensing System', in Interface, February 1995, pp. 94–104. The technique disclosed uses a binocular CCD camera (a pair of CCD cameras) mounted on an autonomously movable head-shaped base. An occurrence of an event in a field of view such as an occurrence of a movement is detected from outputs of the binocular CCD camera. The binocular CCD camera is then turned to a direction in which the event has occurred for determining which part is most important in the field of view. The CCD camera centers the part in the field of view. Consequently the CCD camera follows the object with its movement.

However, the technique described above requires an advanced adjustment mechanism between the two cameras for following an object in motion. Since the binocular CCD camera is fixed to the head-shaped base, it is required to maintain a symmetry between the two cameras with arbitrary movements of the field of view. A controller of the binocular CCD camera therefore incorporates a high-precision adjustment mechanism for video signal gains and binocular convergence angles, for example.

Three-dimensional image display techniques provide two systems in accordance with convergence angles of imaging devices and displays. The first of the two systems adopts two image acquisition devices located at a convergence angle of 0 degree (termed 'parallel convergence' for the following description) and two displays located at a parallel convergence for displaying image information obtained by each of the imaging devices. The second of the two systems uses two imaging devices located at an arbitrary convergence angle and two displays located at an arbitrary convergence angle for displaying image information obtained by each of the imaging devices.

Three-dimensional image display for viewing requires techniques capable of creating a realistic effect with less fatigue of a viewer. In this respect, the two systems described above each have the following problems. The first system generates a parallax greater than that of human eyes between two images displayed since the imaging devices and the displays have no convergence. Consequently, viewer's fatigue is produced which is typical of three-dimensional image display. The second system produces viewer's fatigue typical of three-dimensional image display as well though less than that produced by the first system. When a viewer is viewing an object in a close range with a greater convergence angle, such a convergence angle is optically forced on both eyes of the viewer. Furthermore, a convergence angle is fixed for imaging devices and displays of many of present three-dimensional image display systems implemented through the second system. It is therefore impossible to follow arbitrary object position and viewer's position.

SUMMARY OF THE INVENTION

It is an object of the invention to provide an apparatus for and a method of receiving image information having a plurality of imaging devices following an object with a simple mechanism.

An apparatus for receiving image information of the invention comprises: a plurality of imaging means including a first imaging means and at least one second imaging means other than the first imaging means; a plurality of field of view shifting means each for individually shifting a field of view of each of the plurality of imaging means; and a field of view follow-up control means for controlling the field of view shifting means corresponding to the second imaging means so that the field of view of the second imaging means follows an object of imaging of the first imaging means.

The apparatus for receiving image information allows the plurality of field of view shifting means to individually shift each of the fields of view of the plurality of imaging means. The field of view follow-up control means controls the field of view shifting means corresponding to the second imaging means so that the field of view of the second imaging means follows the object of imaging of the first imaging means.

A method of receiving image information of the invention uses an apparatus for receiving image information having a plurality of imaging means including a first imaging means and at least one second imaging means other than the first imaging means and a plurality of field of view shifting means each for individually shifting a field of view of each of the imaging means. The method comprises: a tracking control step of controlling the field of view shifting means corresponding to the first imaging means so that the field of view of the first imaging means tracks an object of imaging; and a follow-up control step of controlling the field of view shifting means corresponding to the second imaging means so that the field of view of the second imaging means follows the object of imaging tracked by the tracking control step.

The method of receiving image information allows the tracking control step to control the field of view shifting means corresponding to the first imaging means so that the field of view of the first imaging means tracks an object of imaging. The follow-up control step of controlling field of view follow-up controls the field of view shifting means corresponding to the second imaging means so that the field of view of the second imaging means follows the object of imaging tracked by the tracking control step.

A method of receiving image information of the invention uses an apparatus for receiving image information having a plurality of imaging means including a first imaging means and at least one second imaging means other than the first imaging means. The method comprises: a first step of shifting a field of view of the first imaging means and a field of view of the second imaging means coarsely towards an object of imaging in a unified manner; a second step of shifting the field of view of the first imaging means so that the field of view of the first imaging means precisely track the object of imaging; and a third step of shifting the field of view of the second imaging means so that the field of view of the second imaging means follows the object of imaging tracked by the field of view of the first imaging means.

In the method of receiving image information, the fields of view of the first and second imaging means are shifted in a unified manner coarsely towards the object of imaging in the first step of shifting. The field of view of the first imaging means is shifted to precisely track the object of imaging in the second step of shifting. The field of view of the second imaging means is shifted to follow the object of imaging tracked by the field of view of the first imaging means in the third step of shifting.

Other and further objects, features and advantages of the invention will appear more fully from the following description.

DETAILED DESCRIPTION OF THE PREFERRED EMBODIMENTS

Preferred embodiments of the present invention will now be described in detail with reference to the accompanying drawings.

Figure 1:
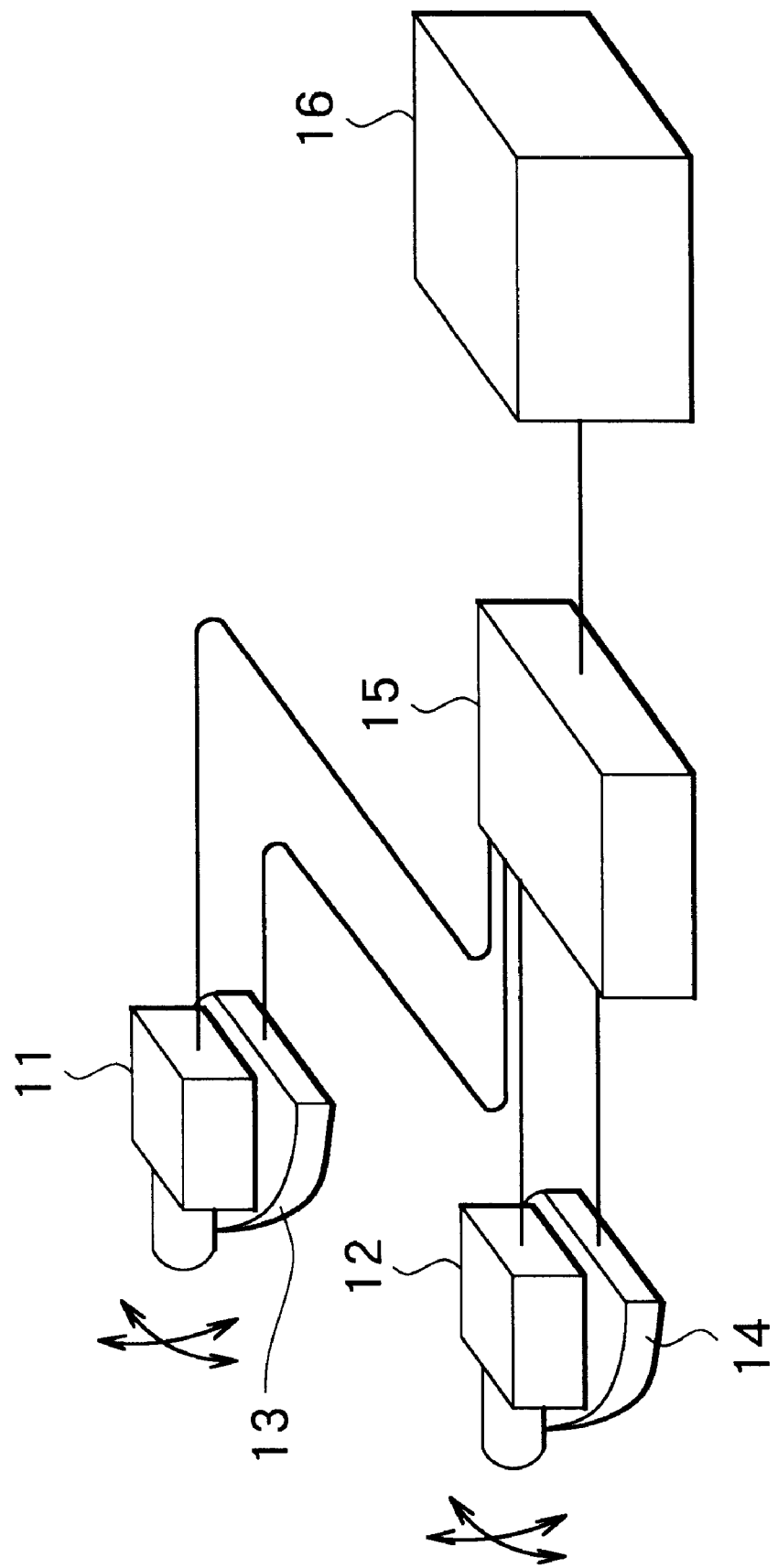
FIG. 1 is a perspective view of an overall configuration of an apparatus for receiving and outputting three-dimensional image information of a first embodiment of the invention.

FIG. 1 is a perspective view of an overall configuration of an apparatus for receiving and outputting three-dimensional image information of a first embodiment of the invention. The apparatus for receiving and outputting three-dimensional image information corresponds to the apparatus for receiving image information of the invention. The apparatus for receiving and outputting three-dimensional image information of the embodiment comprises: video cameras (referred to as camera in the following description) (1) 11 and (2) 12 each having an autofocus fuction, for capturing images of right and left and outputting image signals; pan-and-tilts (1) 13 and (2) 14 as means for moving a field of view each capable of individually moving a field of view of the respective cameras 11 and 12; a controller 15 connected to the cameras 11 and 12 and the pan-and-tilts 13 and 14; and a display 16 connected to the controller 15 as a display means for displaying three-dimensional images at a convergence angle of 0 degree to 3 degrees inclusive based on image information obtained by the cameras 11 and 12. The pan-and-tilts 13 and 14 each support the cameras 11 and 12, respectively, and turn the cameras 11 and 12 in a pan (lateral) direction (left to right) and in a tilt (vertical) direction (up and down) for moving a field of view of the cameras 11 and 12 in a pan direction and a tilt direction.

Figure 2:
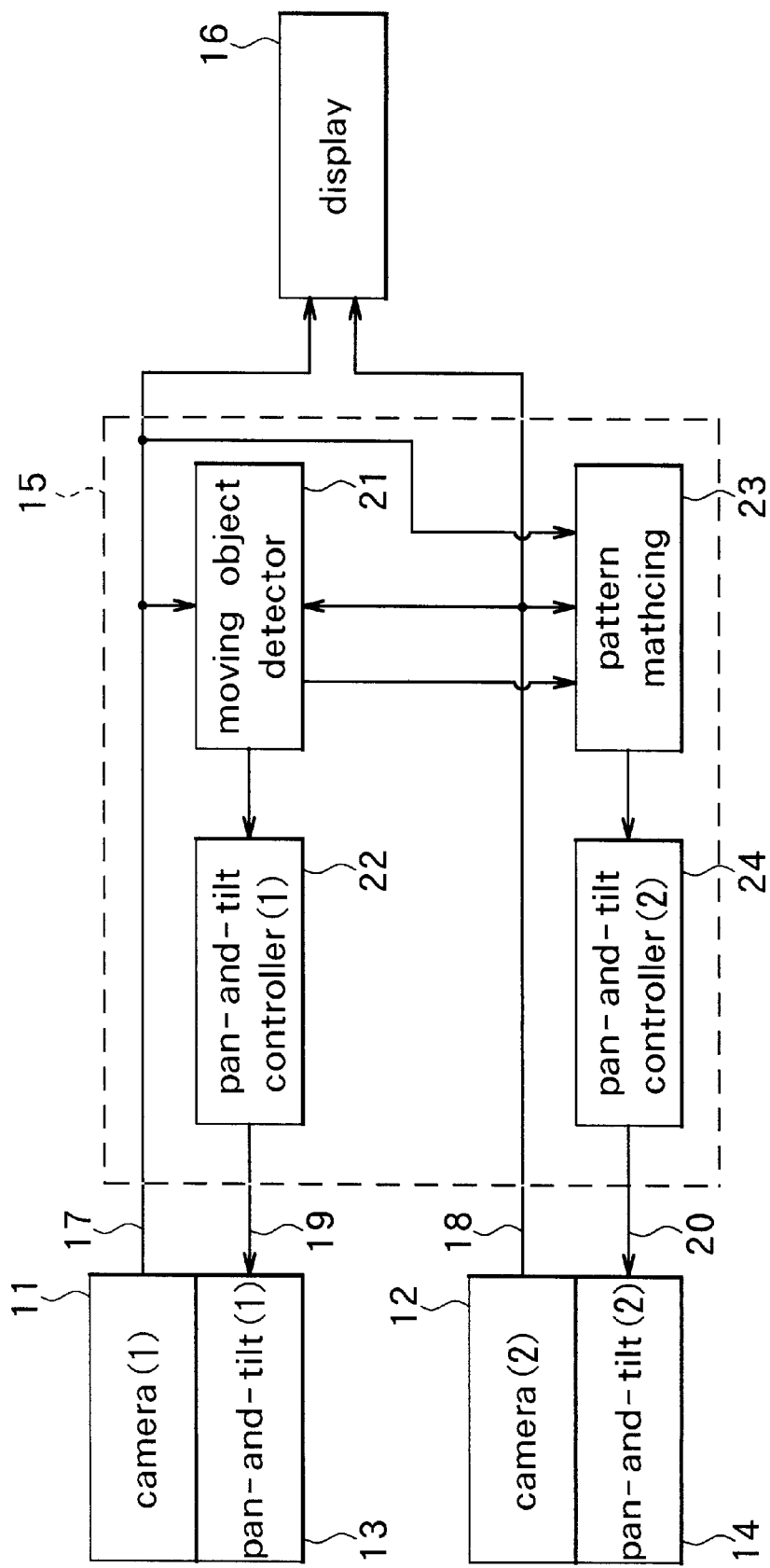
FIG. 2 is a block diagram of the apparatus for receiving and outputting three-dimensional image information of the first embodiment of the invention.

FIG. 2 is a block diagram of the apparatus for receiving and outputting three-dimensional image information of the embodiment. As shown, output signals 17 and 18 each of the cameras 11 and 12, respectively, are inputted to the controller 15. Control signals 19 and 20 from the controller 15 are inputted to the pan-and-tilts 13 and 14. The controller 15 comprises: a moving object detector 21 for receiving output signals 17 and 18 each of the cameras 11 and 12, respectively, and specifying an object of imaging to track based on images captured by the cameras 11 and 12; a pan-and-tilt controller (1) 22 for controlling the pan-and-tilt (1) 13 by sending a control signal 19 thereto so that a field of view of the camera (1) 11 tracks the object specified by the moving object detector 21; a pattern matching section 23 for receiving output signals 17 and 18 each of the cameras 11 and 12, respectively, and performing pattern matching using two images captured by the cameras 11 and 12 for generating information for allowing a field of view of the camera (2) 12 to follow the object of the camera (1) 11; and a pan-and-tilt controller (2) 24 for controlling the pan-and-tilt (2) 14 by sending a control signal 20 thereto so that a field of view of the camera (2) 12 follows the object of the camera (1) 11, based on the information generated at the pattern matching section 23. The pattern matching section 23 utilizes information of the object specified by the moving object detector 21 for pattern matching. The output signals 17 and 18 of the cameras 11 and 12 are sent to the display 16 through the controller 15.

The moving object detector 21 and the pan-and-tilt controller (1) 22 in the controller 15 correspond to a automatic tracking control means of the invention The pattern matching section 23 and the pan-and-tilt controller (2) 24 correspond to a field of view follow-up control means of the invention. The controller 15 includes a central processing unit (CPU), read only memory (ROM) and random access memory (RAM), for example. The controller 15 implemets the components 21 to 24 shown in FIG. 2 through executing programs stored in the ROM, using the RAM as a working area.

Figure 3:
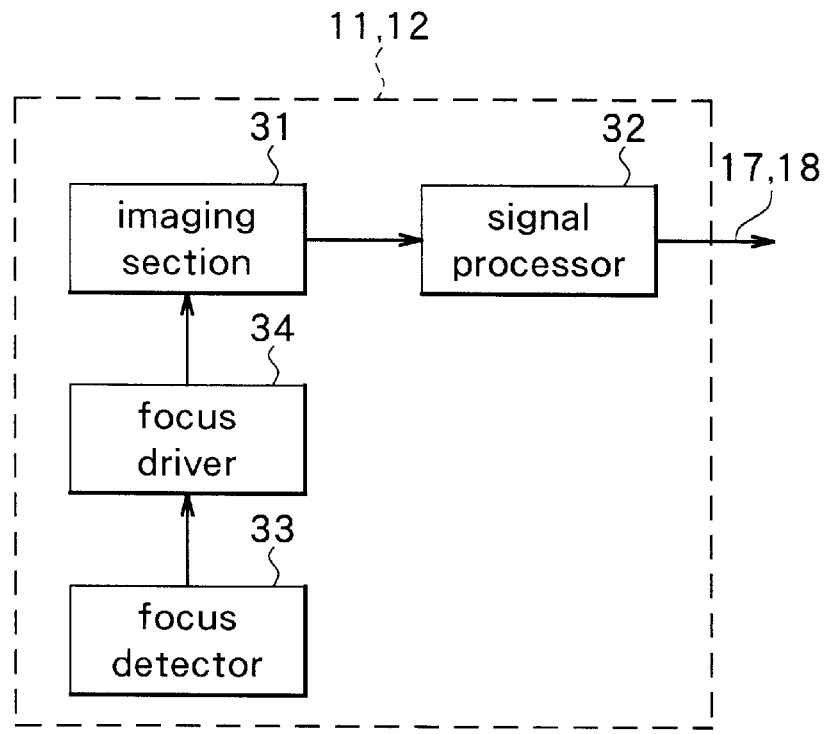
FIG. 3 is a block diagram illustrating a configuration of each camera in FIGS. 1 and 2.

FIG. 3 is a block diagram illustrating a configuration of the cameras 11 and 12 in FIGS. 1 and 2. Each of the cameras 11 and 12 comprises: an imaging section 31 including an image-formation lens system capable of focusing and an image pick-up device using a charge coupled device (CCD), for example, for capturing an image formed by the image-formation lens system; a signal processor 32 for processing signals outputted from the imaging section 31 to send the signals as output signals 17 and 18 to the controller 15; a focus detector 33 for detecting a focus status of an object of imaging; a focus driver 34 for adjusting the image-formation lens system in the imaging section 31 according to the focus status detected by the focus detector 33 for bringing the object into focus.

Figure 4:
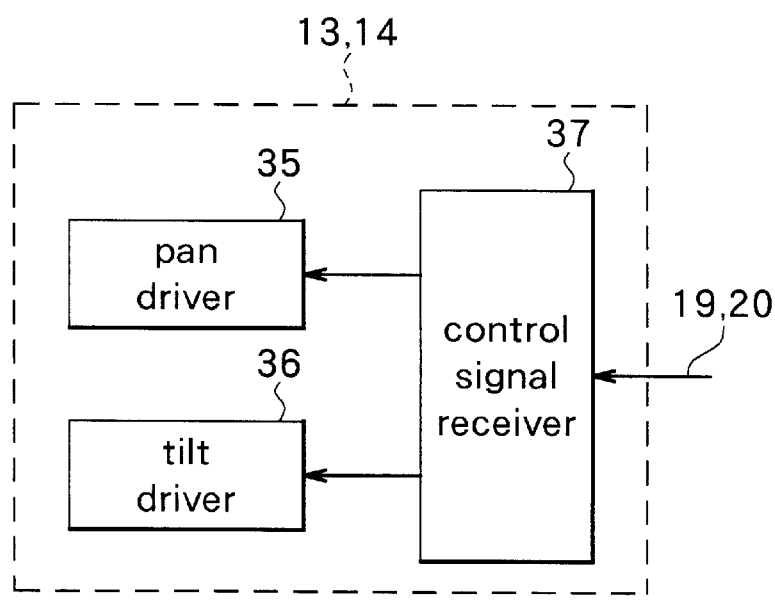
FIG. 4 is a block diagram illustrating a configuration of each pan-and-tilt in FIGS. 1 and 2.

FIG. 4 is a block diagram illustrating a configuration of the pan-and-tilts 13 and 14 in FIGS. 1 and 2. Each of the pan-and-tilts 13 and 14 comprises: a pan driver 35 for turning the cameras 11 and 12 in a pan (lateral) direction; a tilt driver 36 for turning the cameras 11 and 12 in a tilt (vertical) direction; a control signal receiver 37 for receiving control signals 19 and 20 from the controller 15 and dividing the signals into control signals to be sent to each of the drivers 35 and 36.

For example, a lenticular display, a head-mounted display and a head-up display may be used for the display 16 in FIGS. 1 and 2. These displays will be described with reference to FIGS. 5 to 8.

Figure 5:
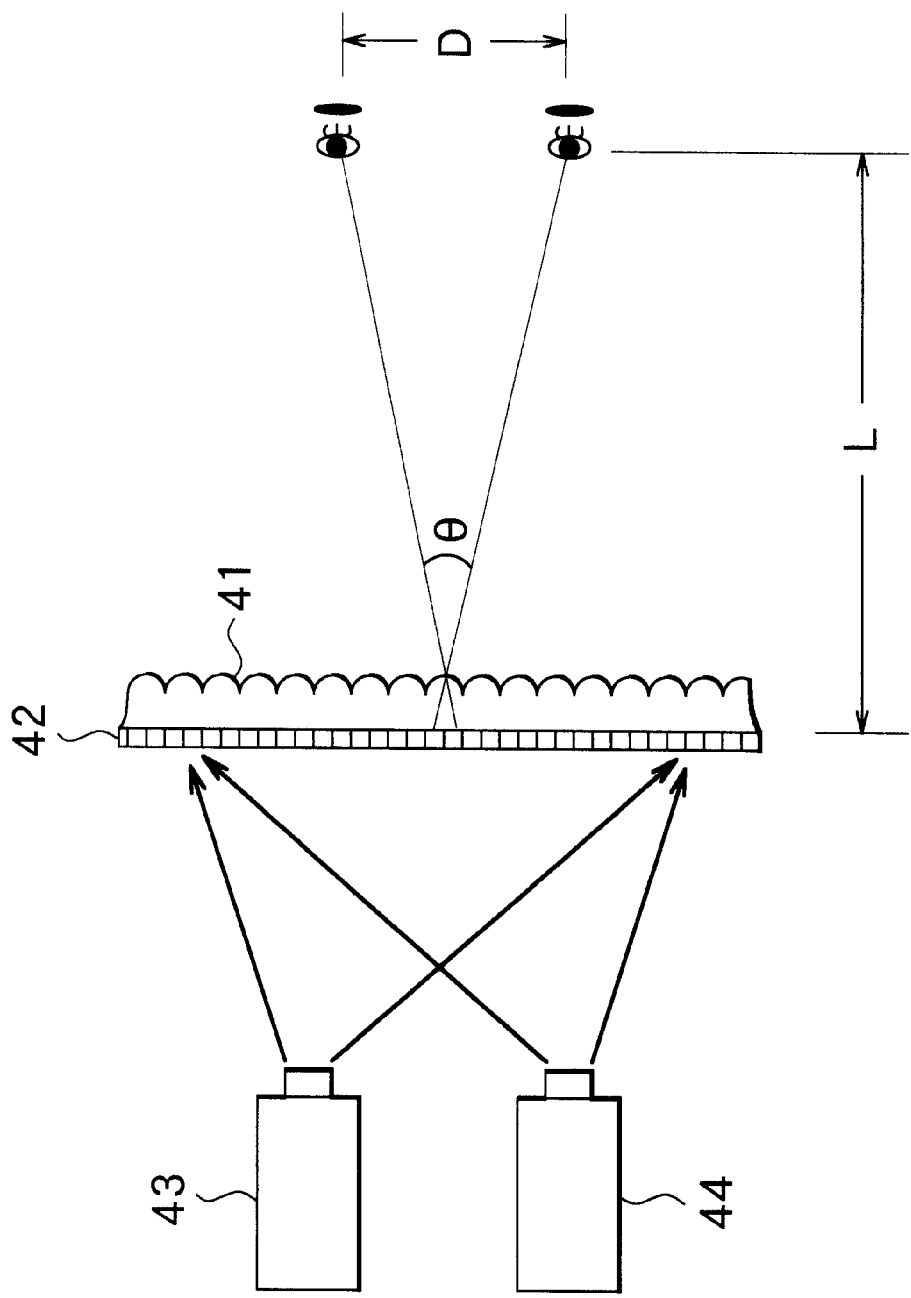
FIG. 5 is a schematic view for illustrating a configuration of a lenticular display used in the first embodiment of the invention.

FIG. 5 is a schematic view for illustrating a configuration of a lenticular display used in the embodiment. The lenticular display comprises: a lenticular screen 41 having a plurality of lenses each half-cylindrical shaped; a diffusion screen 42 placed on a focusing surface of the lenticular screen 41; and liquid crystal video projectors 43 and 44 for projecting right and left images in stripes on the back of the diffusion screen 42.

For using the lenticular display, a process is performed at the controller 15 for transforming an image captured by each of the cameras 11 and 12 into a stripe image divided into stripes pixel by pixel. Image signals of the stripe image corresponding to each of the cameras 11 and 12 are sent to the liquid crystal video projectors 43 and 44, respectively. The liquid crystal video projectors 43 and 44 project the stripe images each corresponding to the cameras 11 and 12 onto the diffusion screen 42. The stripe image corresponding to the camera 11 is projected on a half side of one pitch of the lenses of the lenticular screen 41. The stripe image corresponding to the camera 12 is projected on the other half side of one pitch of the lenses of the lenticular screen 41. As a result, the images each captured by the cameras 11 and 12 enter the respective eye of a viewer by means of a function of the lenticular screen 41 to be perceived as a three-dimensional image. Alternatively, stripe images corresponding to the cameras 11 and 12 may be synthesized through signal processing to be projected onto the diffusion screen 42 by one video projector.

A principle of three-dimensional image display with a lenticular display is described in detail in Isono et al., 'Autostereoscopic 3-D Television Using Eight TV Cameras', in NHK Science and Technical Research Laboratories R & D, no. 38, 1995, pp. 43–54.

A convergence angle ζ of the lenticular display described above is expressed by an equation below, using a distance D between focusing points in a position of a viewer (a distance between both eyes of a viewer) and a distance L from the diffusion screen 42 and the eyes of the viewer.

$$\theta \approx D/L$$

When D=0.065 m and L=5 m, θ=0.013 (rad)=0.74°. The lenticular display will be a means for three-dimensional display at a convergence angle in a range of 0 degree to 3 degrees inclusive.

Figure 6:
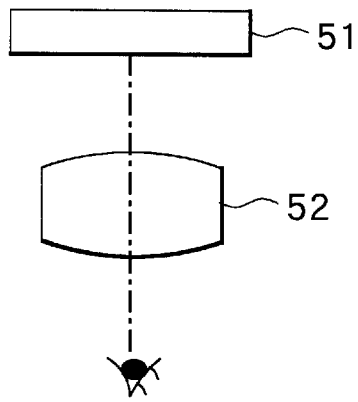
FIG. 6 is a schematic view for illustrating an example of a configuration of a head-mount display used in the first embodiment of the invention.

FIG. 6 is a schematic view for illustrating an example of a configuration of a head-mounted display. The head-mounted display comprises a liquid crystal display 51 for displaying one of right and left images and an eyepiece 52 for projecting the image displayed by the liquid crystal display 51 onto one of eyes of a viewer as a virtual image. Although part corresponding to one of the eyes is shown in FIG. 6, part corresponding to the other of the eyes has a similar configuration.

Figure 7:
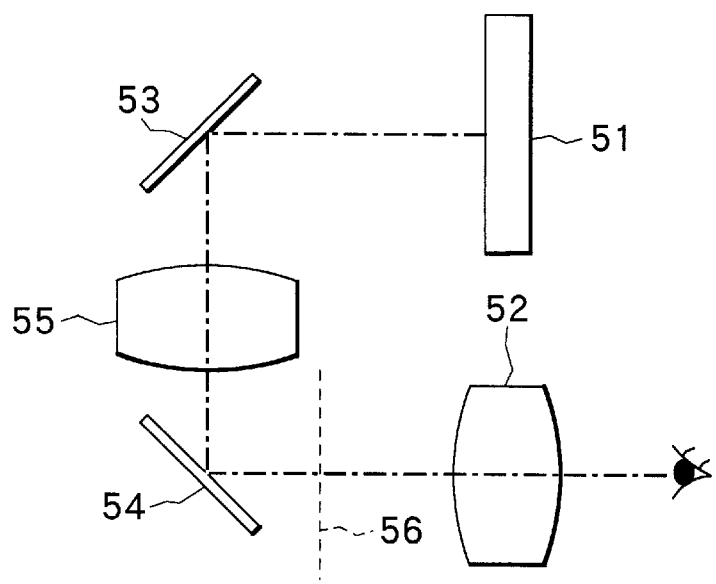
FIG. 7 is a schematic view for illustrating another example of a configuration of a head-mount display used in the first embodiment of the invention.

FIG. 7 is a schematic view for illustrating another example of a configuration of a head-mounted display. The head-mounted display has the liquid crystal display 51 located above the eyepiece 52. Mirrors 53 and 54 as relays are each placed in front of the liquid crystal display 51 and the eyepiece 52, respectively. A relay lens 55 is provided between the mirrors 53 and 54. The head-mounted display shown in FIG. 7 forms an intermediate image 56 of an image displayed by the liquid crystal display 51 in front of the eyepiece 52 by means of the relay optical system made up of the mirrors 53 and 54 and the relay lens 55. A viewer views the intermediate image 56 through the eyepiece 52. Although part corresponding to one of the eyes is shown in FIG. 7, part corresponding to the other of the eyes has a similar configuration.

The components of the head-mounted display shown in FIG. 6 or 7 are held by a goggles-shaped holder worn by a viewer. The head-mounted display shown in FIG. 6 or 7 allows images each displayed by the liquid crystal displays 51 each corresponding to right and left eyes, respectively, to be projected onto the right and left eyes of the viewer, respectively, to be perceived as a three-dimensional image. A convergence angle of the head-mounted display shown in FIG. 6 or 7 is determined to be in a range of 0 degree to 3 degrees inclusive with arrangements of the components.

Figure 8:
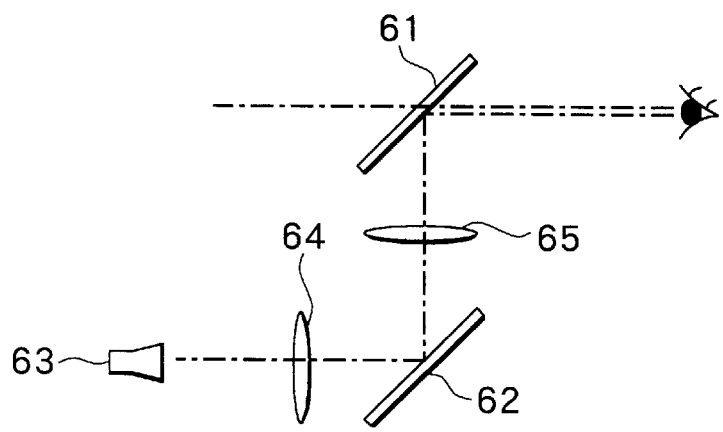
FIG. 8 is a schematic view for illustrating an example of a configuration of a head-up display used in the first embodiment of the invention.

FIG. 8 is a schematic view for illustrating an example of a configuration of a head-up display. The head-up display comprises: a combiner (half mirror) 61 positioned at an angle of 45 degrees from a horizontal in front of viewer's eyes; a mirror 62 placed below the combiner 61 in parallel with the combiner 61; a cathod-ray tube (CRT) 63 located in front of the mirror 62 for displaying one of right and left images; and lenses 64 and 65 having a collimation function each placed between the CRT 63 and the mirror 62 and between the mirror 62 and the combiner 61, respectively. Although part corresponding to one of the eyes is shown in FIG. 8, part corresponding to the other of the eyes has a similar configuration.

In the head-up display, a light from the CRT 63 goes through the lens 64 and is reflected by the mirror 62 and goes through the lens 65 and is reflected by the combiner 61 to enter one of the eyes of the viewer. A scene in the front passing through the combiner 61 enters the eye as well. Consequently, the viewer views the scene in the front and the image of the CRT 63 superimposed on the scene. The head-up display allows images each displayed by the CRTs 63 each corresponding to the right and left eyes, respectively, to be viewed by the right and left eyes of the viewer to be perceived as a three-dimensional image. A convergence angle of the head-up display is determined to be in a range of 0 degree to 3 degrees inclusive with arrangements of the components.

An operation of the apparatus for receiving and outputting three-dimensional image information of the embodiment will now be described. The description illustrates the method of receiving image information of the invention as well.

Figure 9:
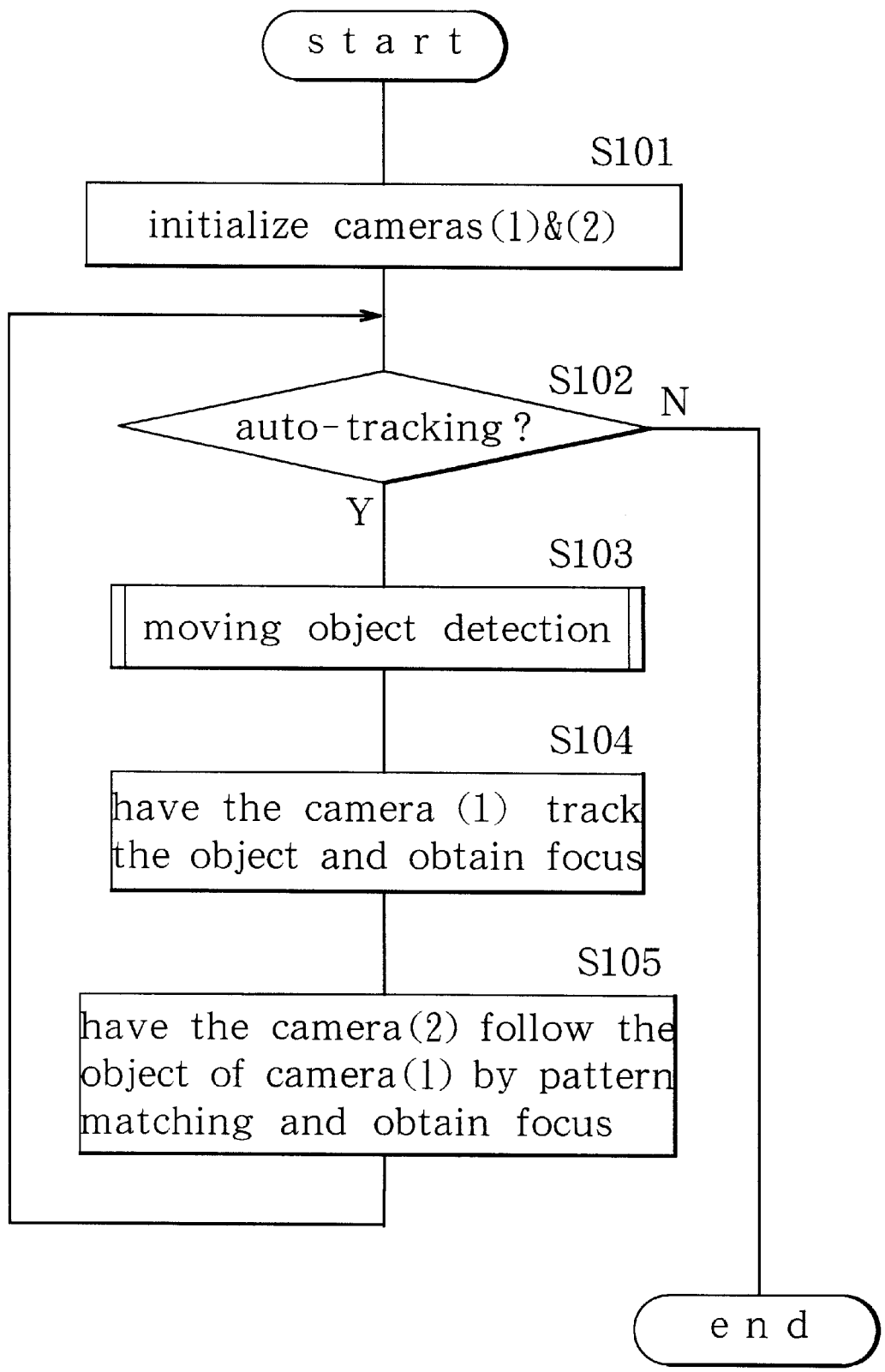
FIG. 9 is a flowchart showing an operation for control of a field of view of the cameras of the apparatus for receiving and outputting three-dimensional image information of the first embodiment of the invention.

Reference is now made to a flowchart of FIG. 9 for describing an operation for control of a field of view of the cameras 11 and 12 of the apparatus for receiving and outputting three-dimensional image information of the embodiment. On power-up, the controller 15 initializes the cameras (1) 11 and (2) 12 (step S101). Specifically, the pan-and-tilt controllers 22 and 24 in the controller 15 control the pan-and-tilts 13 and 14 to fix a field of view of each of the cameras 11 and 12 in a given direction. Next, the controller 15 determines whether to perform automatic tracking or not (step S102). Whether to perform automatic tracking or not is selected with a switch and the like (not shown) by a user. When automatic tracking is performed (Y), the controller 15 detects an object in motion for specifying an object of imaging to track by the moving object detector 21 (step S103). The controller 15 then allows the field of view of the camera (1) 11 to track the object specified by the moving object detector 21 by means of the pan-and-tilt controller (1) 22 (step S104). The camera (1) 11 focuses the object by means of the autofocusing function Next, the controller 15 performs pattern matching by the pattern matching section 23, using two images captured by the cameras 11 and 12 to produce information for allowing the field of view of the camera (2) 12 to follow the object of the camera (1) 11. Using the information, the pan-and-tilt controller (2) 24 allows the field of view of the camera (2) 12 to follow the object of the camera (1) 11 (step S105). The controller 15 then returns to step S102. The camera (2) 12 focuses the object by means of the autofocusing function, too. When automatic tracking is not performed (step S102; N), the controller 15 terminates the control of the field of view of the cameras 11 and 12. The operation in steps S102 to S105 in FIG. 9 is performed frame by frame, for example.

Figure 10:
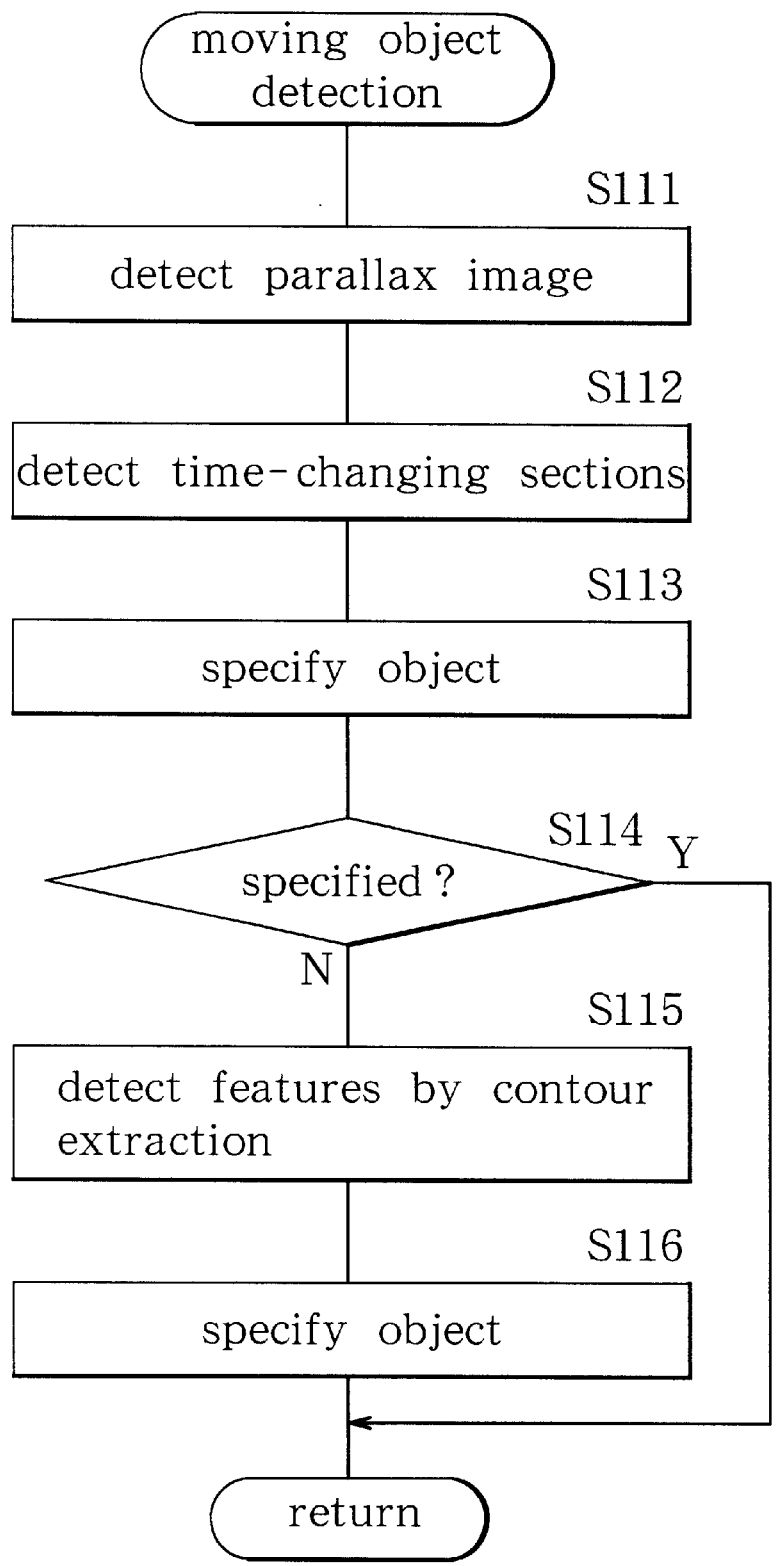
FIG. 10 is a flowchart showing an operation of detecting a moving object in FIG. 9.

FIG. 10 is a flowchart showing the operation of the moving object detection (step S103) in FIG. 9. For detecting the moving object, the moving object detector 21 first detects a parallax image, a difference between right and left images (step S111). Next, the moving object detector 21 detects time-changing sections in the parallax image (step S112). Specifically, a motion vector of each section of the parallax image is detected and a region including similar motion vectors is grasped as a block. Next, the moving object detector 21 specifies the object of imaging to track (step S113). Specifically, the largest of the blocks detected in step S112 is specified as the object to track, for example. The moving object detector 21 then determines whether the object is specified in step S113 (step S114). When the object is specified (Y), the operation for detecting the moving object is terminated. If the object is not specified in step S113 when the object is at rest, for example (step S114; N), a feature of the object is detected through contour extraction (step S115). Specifically, a contour of the parallax image is extracted and a region enclosed by a closed contour is grasped as a block. Next, the moving object detector 21 specifies the object of imaging to track (step S116). To be specific, the largest of the blocks detected in step S115 is specified as the object to track, for example. The operation for moving object detection is terminated when the object is specified.

In step S104 in FIG. 9, the pan-and-tilt (1) 13 is controlled so that the object specified by the moving object detection described above is brought into the center of the field of view of the camera (1) 11.

The moving object detection (step S103) and the automatic tracking (step S104) may be performed through any other method besides the methods described so far. An example is described in Keiko Abe, 'Motion Analysis Based on Spatio-temporal Images' in Proc of the 2nd Sony Research Forum, 1992, pp. 277–282. According to the article, a color producing a maximum output in a predetermined area is detected as the color of an object. Two-dimensional image information of the color is compressed in both horizontal and vertical directions to form a spatio-temporal image (x–t, y–t). The object of the detected color is traced in the spatio-temporal image. Another alternative generally used for motion detection is an optical flow method for tracking pixels having temporally invariable brightness. A pattern matching method for tracking a two-dimensional pattern of a continuous image at a start time may be used as well.

As described so far, the camera (1) 11 tracks the object so that the object is brought into the center of the field of view thereof. The camera (2) 12 tracks the object of the camera (1) 11 by means of the operation of the pattern matching section 23 and the pan-and-tilt controller (2) 24. The operation of the pattern matching section 23 will now be described in detail. The pattern matching section 23 performs pattern matching using two images captured by the cameras 11 and 12. For the pattern matching, an object specified by the moving object detector 21 is the object to be compared with Having determined the object to be compared with, the pattern matching section 23 extracts feature sections distinguishing the object (referred to as features in the following description), such as corners of the outline and line segments, of the object to be compared with in the image captured by the camera (1) 11. Next, the pattern matching section 23 performs pattern matching using the extracted features as a template to detect part best matching the features in the image captured by the camera (2) 12. A direction of movement and a range of movement of the field of view of the camera (2) 12 is then determined for matching the position of the matching part to the position of the features in the image captured by the camera (1) 11. The determined information of movement is sent to the pan-and-tilt controller (2) 24. Based on the information, the pan-andtilt controller (2) 24 controls the pan-and-tilt (2) 14. As a result, the camera (2) 12 follows the object of the camera (1) 11. That is, the object specified through the moving object detection is brought to the center of the field of view of the camera (2) 12 as well.

As thus described, one object is brought into the center of the field of view of each of the cameras 11 and 12 while the object is brought into focus of each of the cameras 11 and 12. Output signals of the cameras 11 an 12 are sent to the display 16 through the controller 15 for a three-dimensional image display at a convergence angle of in a range of 0 degree to 3 degrees inclusive on the display 16.

As described so far, the apparatus for receiving and outputting three-dimensional image information of the embodiment allows the field of view of the camera (1) 11 to track the object of imaging and the field of view of the camera (2) 12 to follow the object of the camera (1) 11, using the pattern matching. As a result, the cameras 11 and 12 easily follow the object for obtaining three-dimensional image information with a simple mechanism without any sophisticated adjustment mechanism that might be required for a plurality of cameras moved in a unified manner to follow the object. Furthermore, a correct convergence angle is determined for the cameras 11 and 12 for obtaining three-dimensional image information. One object is more precisely brought into the center of the field of view of the cameras 11 and 12 since the cameara (2) 12 follows the object of the camera (1) 11 by means of the pattern matching instead of the cameras 11 and 12 each individually following the object.

According to the apparatus for receiving and outputting three-dimensional image information of the embodiment, the convergence angle of the two cameras 11 and 12 automatically varies with a position of the object. As a result, the parallax is reduced regardless of the position of the object, compared to two cameras placed at a parallel convergence or two cameras placed at a fixed convergence angle. Three-dimensional image information is thus obtained with less fatigue of a viewer.

The apparatus for receiving and outputting three-dimensional image information of the embodiment allows a three-dimensional image display at a convergence angle in a range of 0 degree to 3 degrees inclusive based on the three-dimensional image information obtained as described above. Consequently, an image at a close range taken by the cameras 11 and 12 is perceived by a viewer as an image larger than the actual size of the object projected stereoscopically at a distance. As a result, a realistic three-dimensional image display is achieved like a closeup technique of filmmaking for representing a view at a close range by projecting a subject larger in size. Furthermore, viewer's fatigue is less since a greater convergence angle is not forced on the viewer viewing at a close range.

According to the apparatus for receiving and outputting three-dimensional image information of the embodiment, the convergence angle of the two cameras 11 and 12 automatically varies with a position of the object while the three-dimensional image is displayed at a parallel convergence or its neighborhood. Therefore the apparatus is applicable to any object position and any viewing position.

Figure 11:
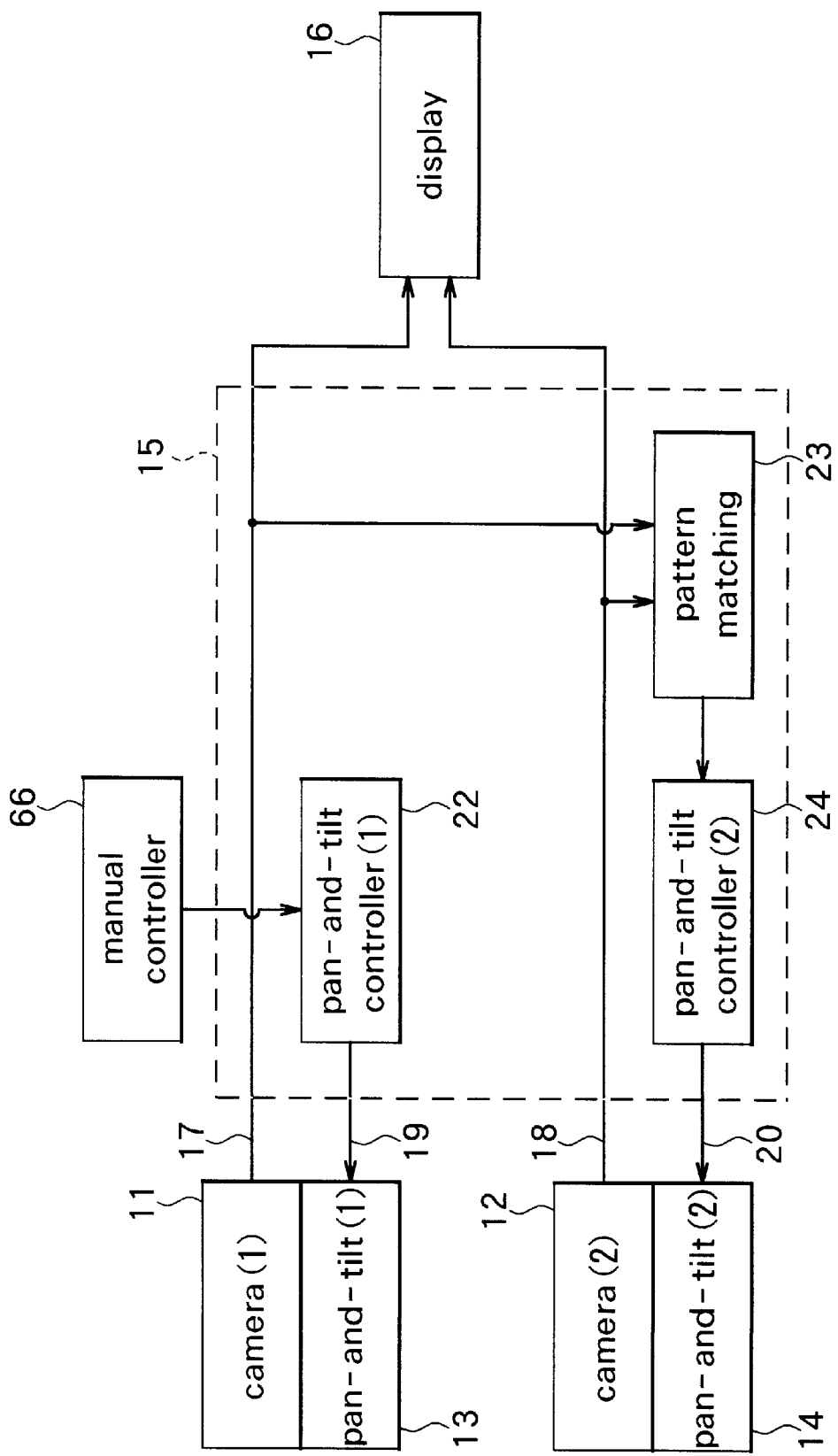
FIG. 11 is a block diagram of the apparatus for receiving and outputting three-dimensional image information of a second embodiment of the invention.

Reference is now made to FIG. 11, a block diagram of the apparatus for receiving and outputting three-dimensional image information of a second embodiment of the invention. In the apparatus of the second embodiment, the moving object detector 21 is excluded from the controller 15 of the first embodiment. Instead, a manual controller 66 is provided for giving information for manual operation of the pan-and-tilt (1) 13 to the pan-and-tilt controller (1) 22.

The embodiment allows any movement of a field of view of the camera (1) 11 by a user operating the manual controller 66. In a manner similar to that of the first embodiment, the camera (2) 12 follows the object of the camera (1) 11 by means of the functions of the pattern matching section 23 and the pan-and-tilt controller (2) 24. Since the moving object detector 21 is excluded from the embodiment, the pattern matching section 23 performs feature extraction only from an image captured by the camera (1) 11 for pattern matching. The remainder of the configuration, operations and effects of the embodiment are similar to those of the first embodiment.

Figure 12:
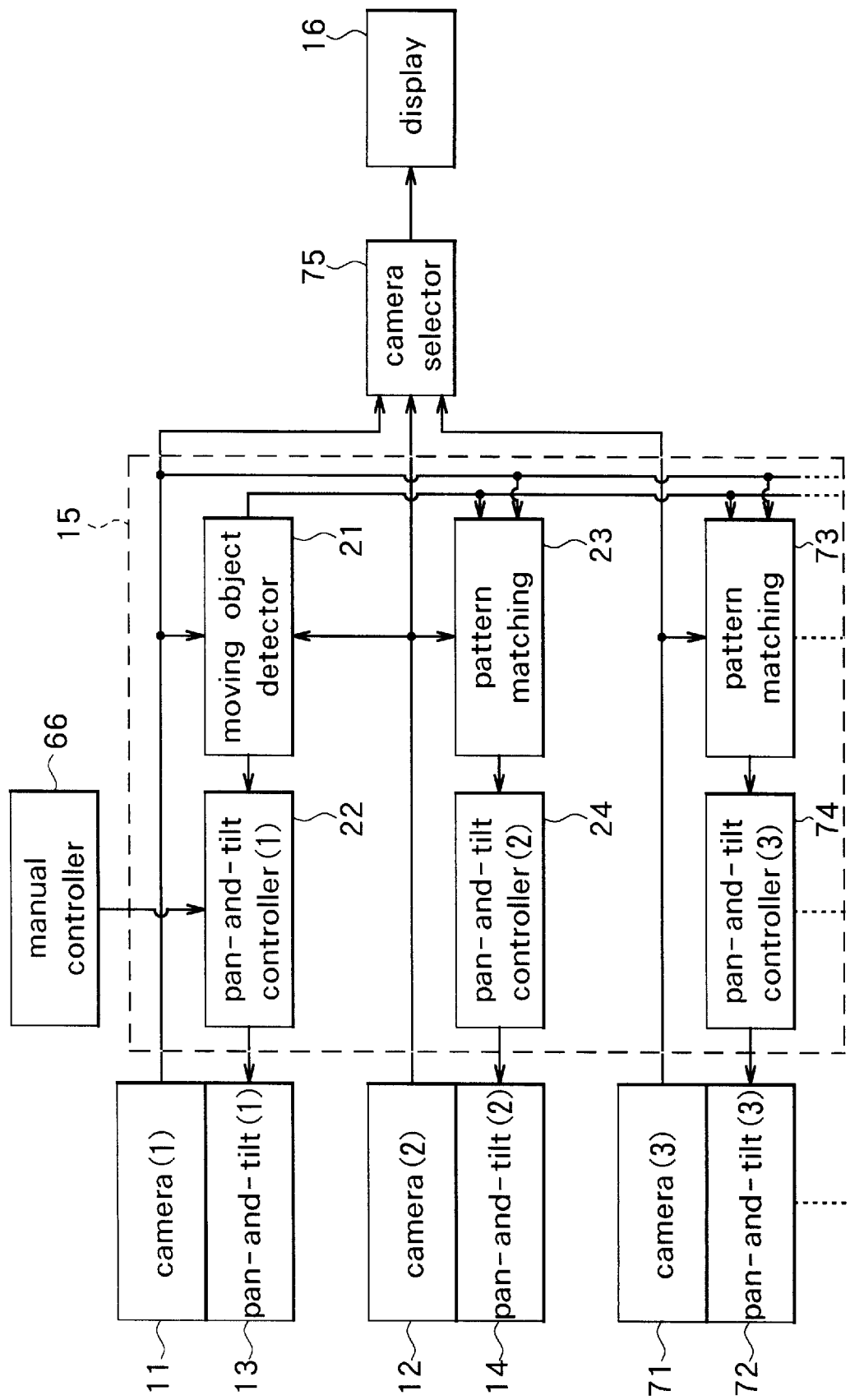
FIG. 12 is a block diagram of the apparatus for receiving and outputting three-dimensional image information of a third embodiment of the invention.

Reference is now made to FIG. 12, a block diagram of the apparatus for receiving and outputting three-dimensional image information of a third embodiment of the invention. In the apparatus of the third embodiment, another camera or more (a camera (3) 71, . . . ), another pan-and-tilt or more (a pan-and-tilt (3) 72, . . . ) corresponding to the camera are added to the apparatus of the first embodiment. Description will be given only to components corresponding to the additional camera (3) 71 and pan-and-tilt (3) 72. The same will apply to other additional cameras and pan-and-tilts.

In addition to the controller 15 of the first embodiment, the controller 15 of the third embodiment further comprises: a pattern matching section 73 for performing pattern matching using two images captured by the cameras (1) 11 and (3) 71 and generating information for having a field of view of the camera (3) 71 follow the object of the camera (1) 11; and a pan-and-tilt controller (3) 74 for controlling the pan-and-tilt (3) 72 so that the field of view of the camera (3) 71 follows the object of the camera (1) 11 based on information generated at the pattern matching section 73.

The apparatus of the embodiment further comprises the manual controller 66 for giving information for manual operation of the pan-and-tilt (1) 13 to the pan-and-tilt controller (1) 22.

The apparatus of the embodiment further comprises a camera selector 75 for allowing all the output signals of the cameras 11, 12, 71, . . . outputted through the controller 15 to be sent to the display 16 or selected two of the signals to be sent to the display 16.

Figure 13:
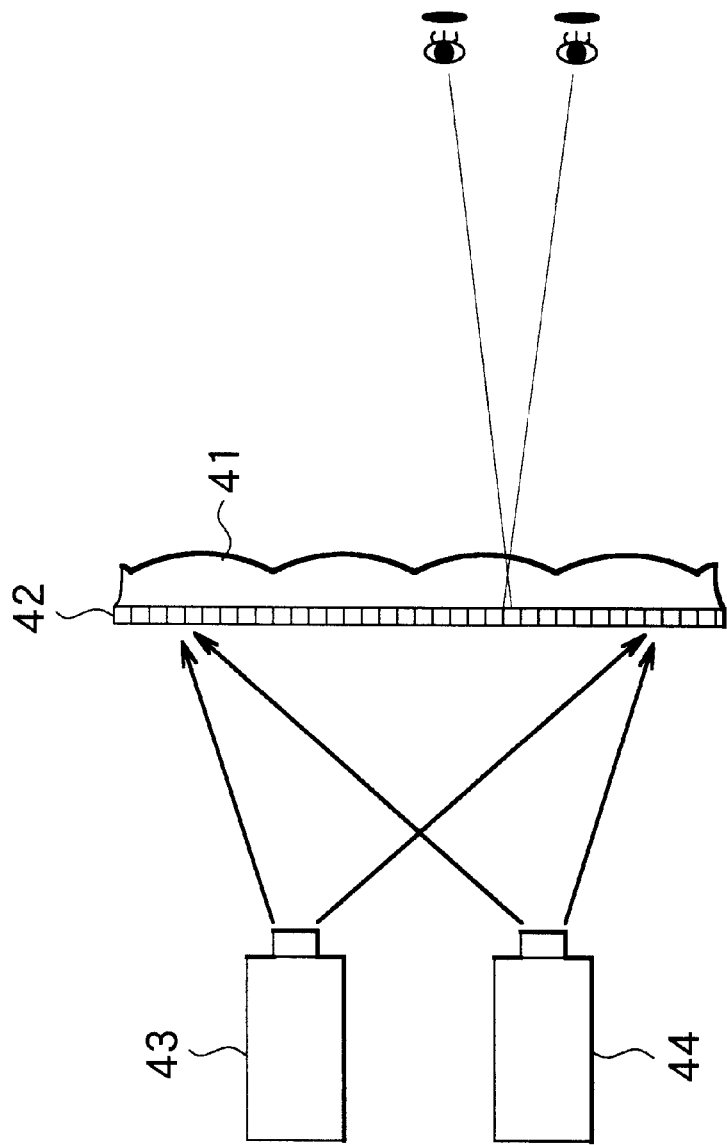
FIG. 13 is a schematic view for illustrating a configuration of a lenticular display used in the third embodiment of the invention.

The apparatus of the embodiment uses the three cameras or more. Therefore a lenticular display corresponding to the number of the cameras is used for the display 16 instead of the one shown in FIG. 5. FIG. 13 is a schematic view for illustrating a configuration of a lenticular display used with eight cameras arranged in line. As the one shown in FIG. 5, the lenticular display basically comprises the lenticular screen 41, the diffusion screen 42 and the liquid crystal video projectors 43 and 44. For using the lenticular display, images taken by four even-numbered cameras out of the eight cameras are synthesized at the controller 15 to form a stripe image. The stripe image is then projected onto the diffusion screen 42 by the liquid crystal video projector 43. Similarly, images taken by four odd-numbered cameras out of the eight cameras are synthesized at the controller 15 to form a stripe image. The stripe image is then projected in an interleaving manner onto the diffusion screen 42 by the liquid crystal video projector 44. As a result, each pixel of the stripe image corresponding to each of the eight cameras is regularly arranged in the order of the numbers of the cameras in one pitch of the lenses of the lenticular screen 41 on the diffusion screen 42. By means of the function of the lenticular screen 41, two of the images each corresponding to the eight cameras each selectively enter left and right eyes of a viewer, respectively, to be perceived as a three-dimensional image. If the viewer shifts a viewing position in a lateral direction, two different images each selectively enter the left and right eyes of the viewer, respectively, to be perceived as a three-dimensional image taken at a different point of view.

According to the apparatus for receiving and outputting three-dimensional image information of the embodiment, when automatic tracking is performed with the moving object detector 21, a field of view of the camera (1) 11 tracks the object in a manner similar to the first embodiment. Fields of view of the other cameras 12, 71, . . . follow the object of the camera (1) 11 by means of the functions of the pattern matching sections 23, 73, . . . and the pan-and-tilt controllers 24, 74, . . . each corresponding to the respective cameras. When the manual controller 66 is used, the field of view of the camera (1) 11 is arbitrarily shifted while the fields of view of the other cameras 12, 71, . . . follow the object of the camera (1) 11 by a user operating the manual controller 66.

According to the apparatus for receiving and outputting three-dimensional image information of the embodiment, when a lenticular display is used for the display 16, output signals of all the cameras 11, 12, 71, . . . are sent to the display 16 by means of the camera selector 75. When a head-mounted display or a head-up display is used for the display 16, an output signal of the camera (1) 11 and selected one of output signals of the other cameras 12, 71, . . . are sent to the display 16 by means of the camera selector 75.

The remainder of the configuration, operations and effects of the embodiment are similar to those of the first and second embodiments. Alternatively, either the moving object detector 21 or the manual controller 66 may be equipped in the embodiment.

Figure 14:
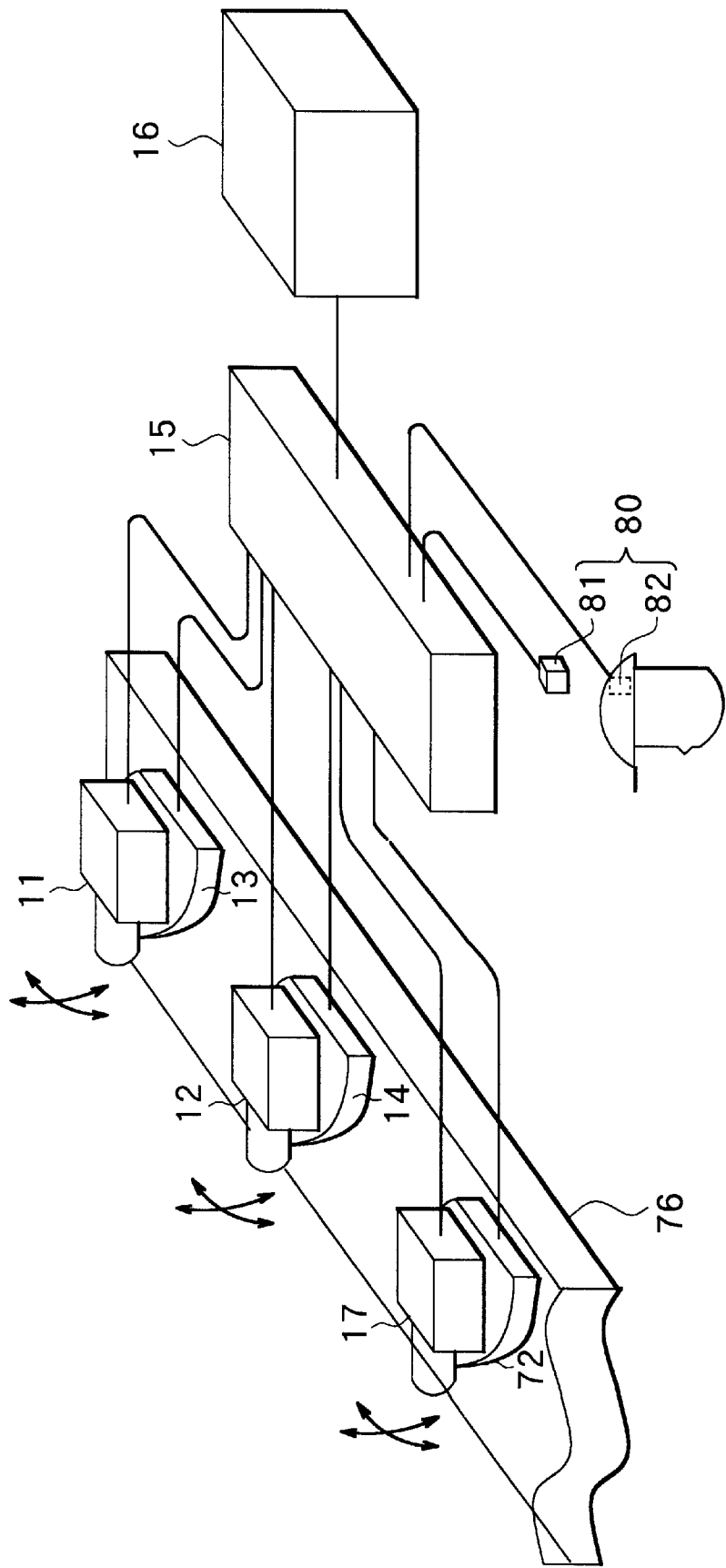
FIG. 14 is a perspective view of an overall configuration of an apparatus for receiving and outputting three-dimensional image information of a fourth embodiment of the invention.

FIG. 14 is a perspective view of an overall configuration of an apparatus for receiving and outputting three-dimensional image information of a fourth embodiment of the invention. As shown, the apparatus of the fourth embodiment comprises the cameras 11, 12, 71, . . . and the pan-and-tilts 13, 14, 72, . . . corresponding to the respective cameras as the third embodiment. The apparatus of the fourth embodiment further comprises a pan-and-tilt base 76 for supporting the pan-and-tilts 13, 14, 72, . . . and functioning as a unified shifting means. The pan-and-tilt base 76 allows the pan-and-tilts 13, 14, 72, . . . to turn in a unified manner in pan and tilt directions so that fields of view of the cameras 11, 12, 71, . . . shift in pan and tilt directions in a unified manner.

Figure 15:
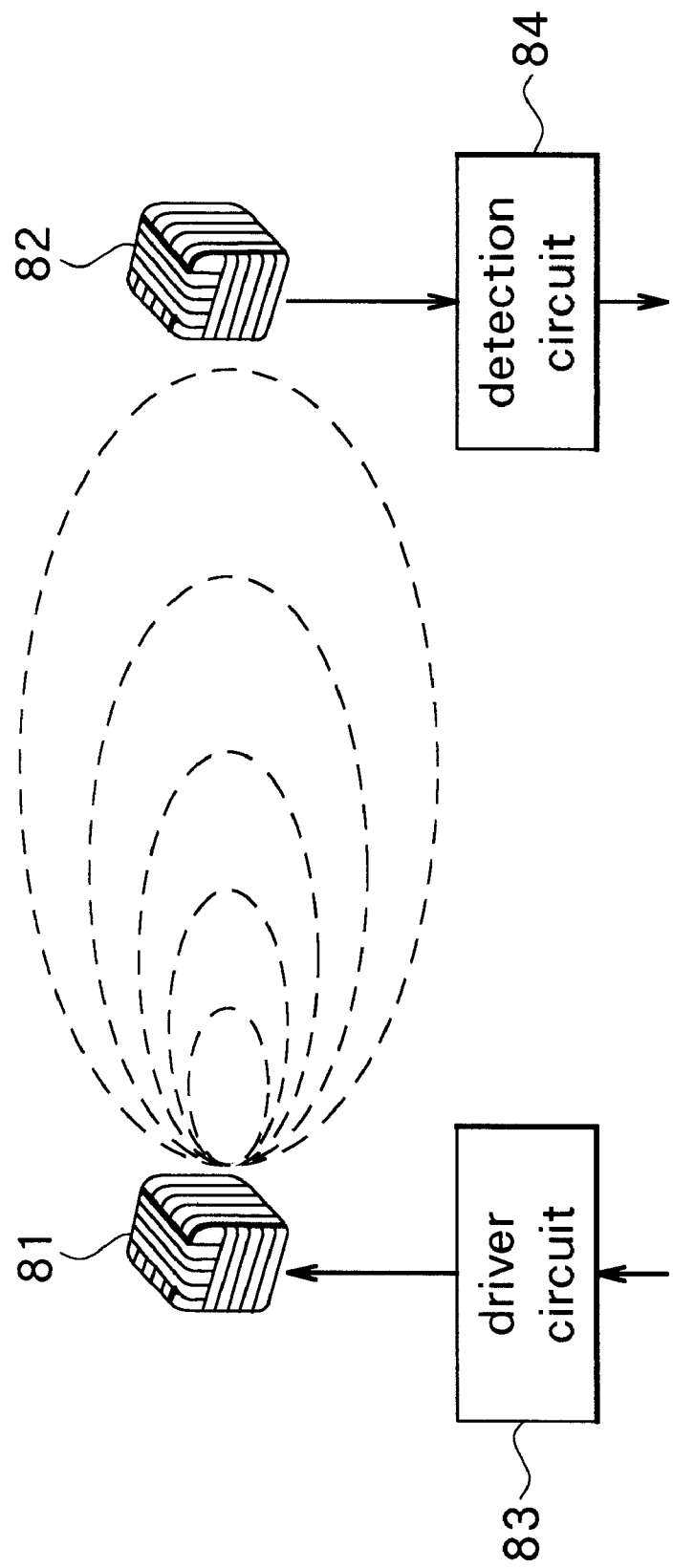
FIG. 15 is a block diagram illustrating a configuration of a head sensor in FIG. 14.

The apparatus for receiving and outputting three-dimensional image information of the embodiment further comprises a head sensor 80 as a detecting means for detecting a motion of a head of a person viewing an object of imaging. As shown in FIG. 15, the head sensor 80 comprises: a source coil 81 including three coils intersecting one another for producing magnetic fields in three dimensions; a sensor coil 82 including three coils intersecting one another for producing currents in accordance with changes in the magnetic fields in three dimensions; a driver circuit 83 for driving the source coil 81; and a detection circuit 84 for converting the currents produced at the sensor coil 82 into voltages for output. As shown in FIG. 14, the sensor coil 82 is worn on the head of the viewer of the object of image acquisition. The source coil 81 is placed in proximity to the head of the viewer. The driver circuit 83 and the detection circuit 84 are connected to the controller 15.

Figure 16:
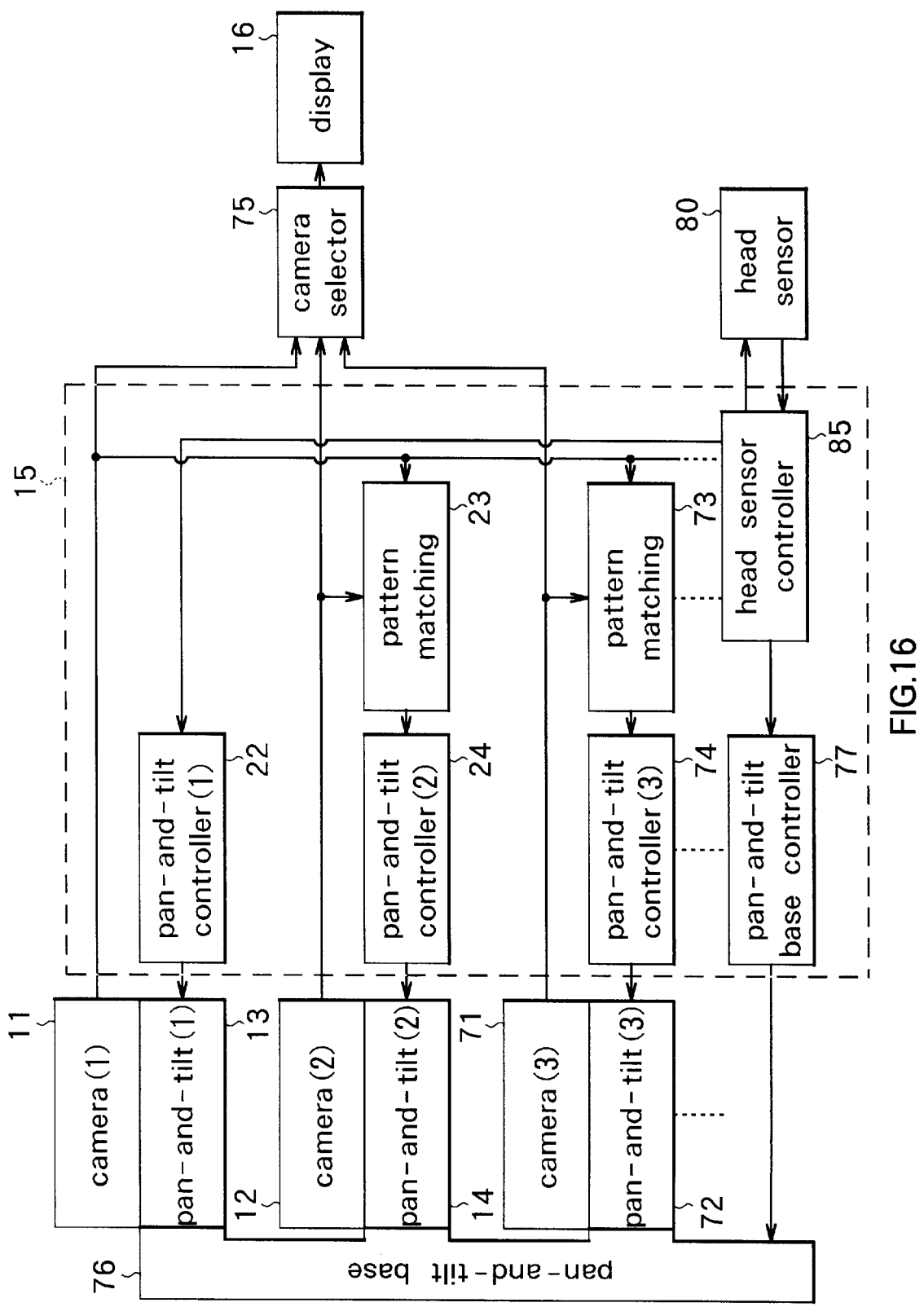
FIG. 16 is a block diagram of the apparatus for receiving and outputting three-dimensional image information of the fourth embodiment of the invention.

FIG. 16 is a block diagram of the apparatus for receiving and outputting three-dimensional image information of the embodiment. In the apparatus of the embodiment, the moving object detector 21 is excluded from the controller 15 of the third embodiment. Instead, the controller 15 includes a pan-and-tilt base controller 77 for controlling the pan-and-tilt base 76 and a head sensor controller 85 for controlling the head sensor 80. The manual controller 66 of the third embodiment is excluded from the fourth embodiment.

The head sensor controller 85 controls the driver circuit 83 of the head sensor 80. Furthermore, the head sensor controller 85 receives output signals of the detection circuit 84 to perform calculations such as integration for detecting a direction of a field of view or a direction of a line of vision, in particular, of the viewer of the object of imaging through determining a position and a status of the head of the viewer. The information of the direction of the line of vision obtained by the head sensor controller 85 is sent to the pan-and-tilt base controller 77 and the pan-and-tilt controller (1) 22. The remainder of the configuration of the embodiment is similar to that of the third embodiment.

Figure 17:
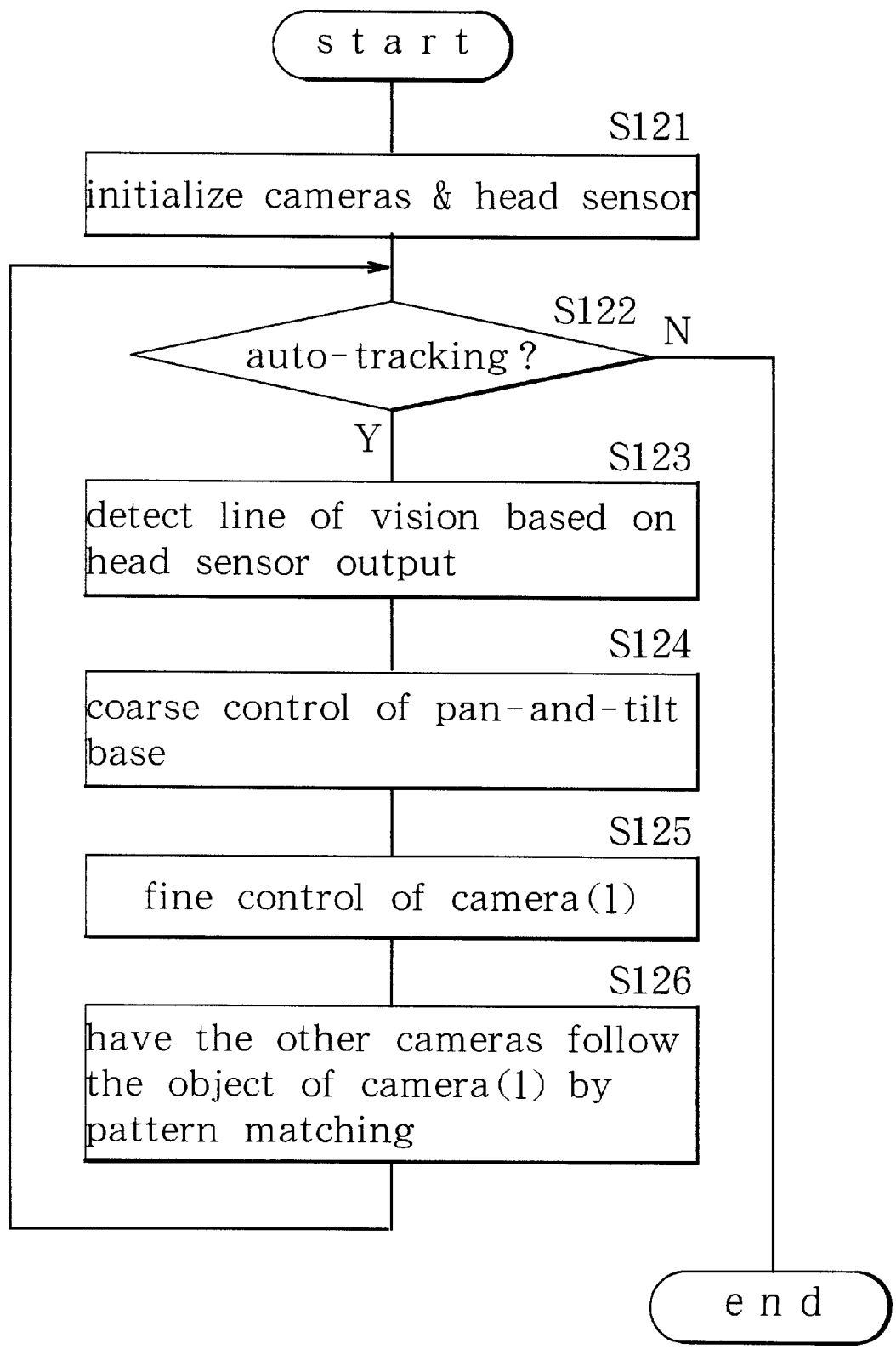
FIG. 17 is a flowchart showing an operation for control of a field of view of the cameras of the apparatus for receiving and outputting three-dimensional image information of the fourth embodiment of the invention.

An operation of the apparatus for receiving and outputting three-dimensional image information of the embodiment will now be described. FIG. 17 is a flowchart showing an operation for control of a field of view of each of the cameras of the apparatus for receiving and outputting three-dimensional image information of the embodiment. As shown, on power-up, the controller 15 initializes the cameras 11, 12, 71, . . . and the head sensor 80 (step S121). Specifically, the pan-and-tilt controllers 22, 24, 74 . . . and the pan-and-tilt controller 77 in the controller 15 control the pan-and-tilts 13, 14, 72 . . . and the pan-and-tilt base 76 to fix a field of view of each of the cameras 11, 12, 71 . . . in a given direction. Additionally, a direction of the line of vision of the viewer turning to the front is determined by the head sensor controller 85 to be an initial direction (a front direction). Next, the controller 15 determines whether to perform automatic tracking or not (step S122). When automatic tracking is performed (Y), the controller 15 detects a line of vision based on outputs of the head sensor 80 by means of the head sensor controller 85 (step S123). The controller 15 then performs coarse control of the pan-and tilt base 76 by means of the pan-and-tilt base controller 77 based on low frequency components in the detected information on the direction of the line of vision. Through this coarse control the fields of view of the cameras 11, 12 71, . . . coarsely tracks the direction of the line of vision (step S124). Next, the controller 15 performs fine control of the camera (1) 11 by means of the pan-and-tilt controller (1) 22 based on high frequency components in the detected information on the direction of the line of vision. Through this fine control the field of vision of the camera (1) 11 precisely tracks the direction of the line of vision (step S125). The camera (1) 11 focuses the object by means of the autofocusing function.

Next, the controller 15 performs pattern matching by the pattern matching sections 23, 73, . . . using two images captured by the camera (1) 11 and one of the cameras 12, 71, . . . to produce information for allowing the fields of view of the cameras 12, 71, . . . to follow the object of the camera (1) 11. Using the information, the pan-and-tilt controllers 24, 74, . . . allows the fields of view of the cameras 12, 71, . . . to follow the object of the camera (1) 11 (step S126). The controller 15 then returns to step S122. The cameras 12, 71, . . . focus the object by means of the autofocusing function, too. When automatic tracking is not performed (step S122; N), the controller 15 terminates the control of the fields of view of the cameras. The operation in steps S122 to S126 in FIG. 17 is performed frame by frame, for example.

The apparatus for receiving and outputting three-dimensional image information of the embodiment allows the field of view of each of the cameras to follow the direction of the line of vision of the viewer of the object of image acquisition. In addition, both coarse and fine controls are performed. As a result, an improvement is achieved in accuracy and speed in the follow-up.

In the embodiment, driving of the pan-and-tilt (1) 13 may be stopped while the pan-and-tilt base 76 is driven. For the head sensor 80, an (angular) acceleration sensor such as a gyro sensor may be used instead of the sensor using the source coil 81 and the sensor coil 82. In the case of the acceleration sensor, a position and a status of the head will be detected by integrating of second order of outputs of the acceleration sensor. The remainder of the operations and effects of the embodiment are similar to those of the third embodiment.

Figure 18:
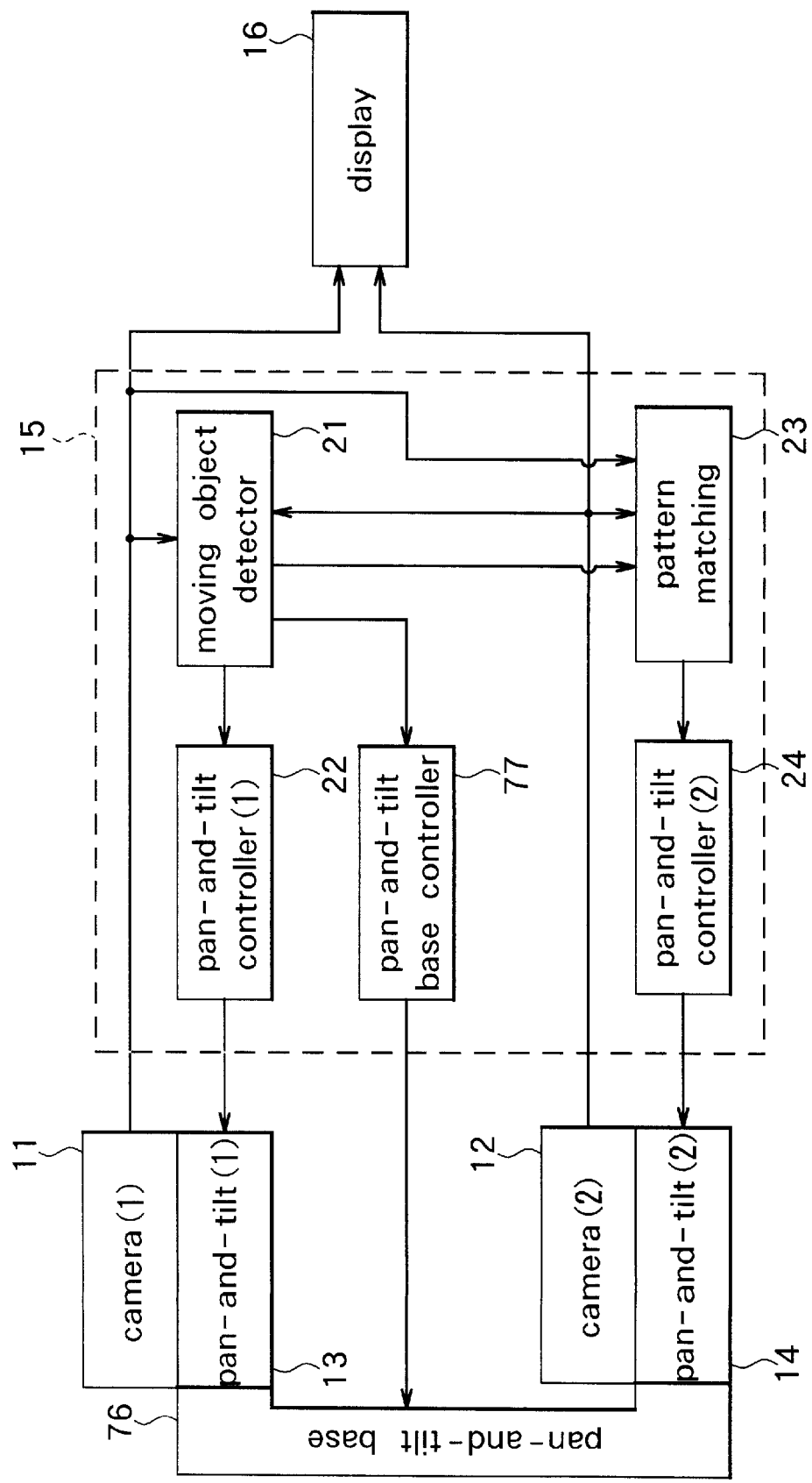
FIG. 18 is a block diagram of the apparatus for receiving and outputting three-dimensional image information of a fifth embodiment of the invention.

FIG. 18 is a block diagram of the apparatus for receiving and outputting three-dimensional image information of a fifth embodiment of the invention. In addition to the apparatus of the first embodiment, the apparatus of the fifth embodiment further comprises the pan-and-tilt base 76 for supporting the pan-and-tilts 13 and 14 and allowing the pan-and-tilts 13 and 14 to turn in a unified manner in pan and tilt directions so that fields of view of the cameras 11 and 12 shift in pan and tilt directions in a unified maner. In addition to the components of the controller 15 of the first embodiment, the controller 15 of the fifth embodiment further comprises the pan-and-tilt base controller 77 for controlling the pan-and-tilt base 76. In the embodiment, information on a position of the object of imaging specified by the moving object detector 21 is sent to the pan-and-tilt base controller 77 besides the pan-and-tilt controller (1) 22.

In the apparatus of the embodiment, the pan-and-tilt base controller 77 performs coarse control of the pan-and-tilt base 76 based on low frequency components in the information on the position of the object of imaging specified by the moving object detector 21. Through this coarse control the fields of view of the cameras 11 and 12 coarsely track the object. The pan-and-tilt controller (1) 22 performs fine control of the camera (1) 11 based on high frequency components in the information on the position of the object. Through this fine control the field of vision of the camera (1) 11 precisely tracks the object.

The apparatus for receiving and outputting three-dimensional image information of the embodiment adopts both coarse and fine controls. As a result, accuracy and speed in the response improve. The remainder of the configuration, operations and effects of the embodiment are similar to those of the first embodiment.

Figure 19:
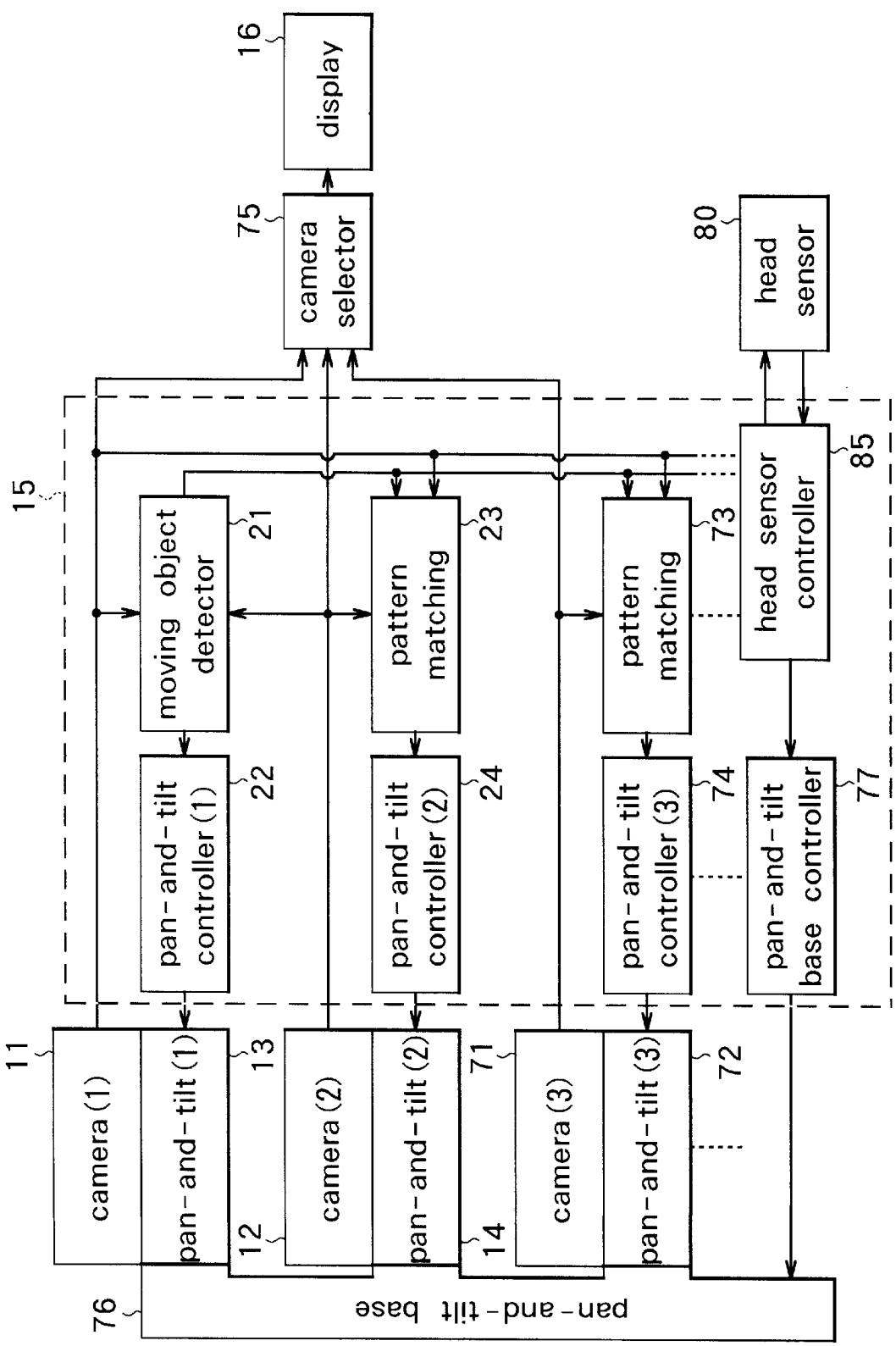
FIG. 19 is a block diagram of the apparatus for receiving and outputting three-dimensional image information of a sixth embodiment of the invention

FIG. 19 is a block diagram of the apparatus for receiving and outputting three-dimensional image information of a sixth embodiment of the invention. The apparatus of the embodiment further comprises the moving object detector 21 in the controller 15 in addition to the components of the apparatus of the fourth embodiment. In a manner similar to the first embodiment, the pan-and-tilt controller (1) 22 controls the pan-and-tilt (1) 13 so that the field of view of the camera (1) 11 tracks the object specified by the moving object detector 21. The pan-and-tilt base controller 77 controls the pan-and-tilt base 76 based on information on a direction of a line of vision detected by the head sensor controller 85. Through this control the fields of view of the cameras 11, 12, 71, . . . coarsely track the direction of the line of vision.

Figure 20:
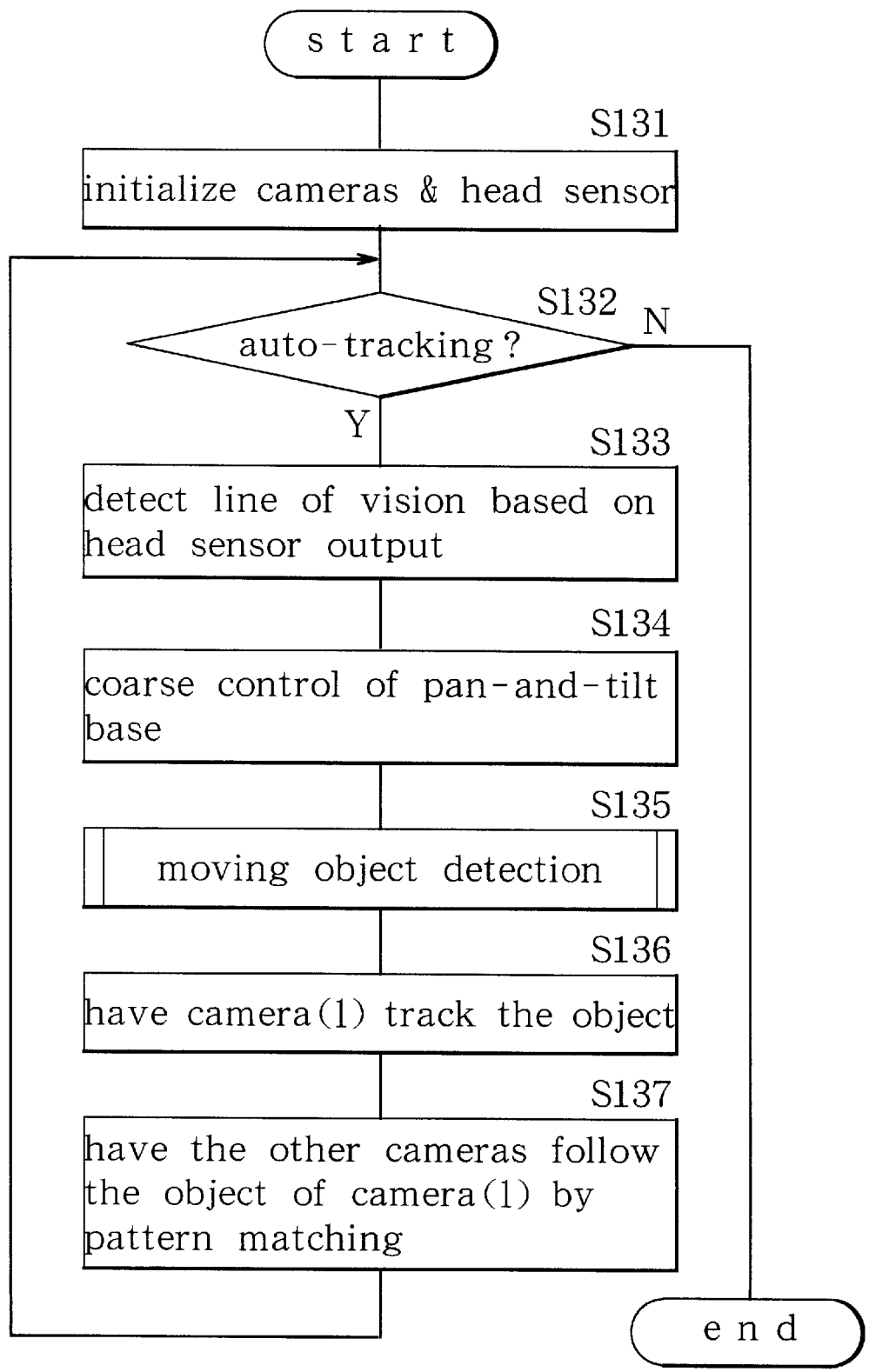
FIG. 20 is a flowchart showing an operation for control of a field of view of the cameras of the apparatus for receiving and outputting three-dimensional image information of the sixth embodiment of the invention.

An operation of the apparatus for receiving and outputting three-dimensional image information of the embodiment will now be described FIG. 20 is a flowchart showing an operation for control of a field of view of each of the cameras of the apparatus for receiving and outputting three-dimensional image information of the embodiment. As shown, on power-up, the controller 15 initializes the cameras 11, 12, 71, . . . and the head sensor 80 (step S131). Next, the controller 15 determines whether to perform automatic tracking or not (step S132). When automatic tracking is performed (Y), the controller 15 detects a direction of a line of vision based on outputs of the head sensor 80 by means of the head sensor controller 85 (step S133). The controller 15 then performs coarse control of the pan-and-tilt base 76 by means of the pan-and-tilt base controller 77 based on the detected information on the direction of the line of vision. Through this coarse control the fields of vision of the cameras 11, 12, 71, . . . coarsely track the direction of the line of vision (step S134). Next, the controller 15 performs moving object detection for specifying an object of imaging to track (step S135). The field of view of the camera (1) 11 tracks the object by means of the pan-and-tilt controller (1) 22 (step S136). Next, the controller 15 performs pattern matching by the pattern matching sections 23, 73, . . . using two images captured by the camera (1) 11 and one of the cameras 12, 71, . . . to produce information for allowing the fields of view of the cameras 12, 71, . . . to follow the object of the camera (1) 11. Using the information, the pan-and-tilt controllers 24, 74, . . . allows the fields of view of the cameras 12, 71, . . . to follow the object of the camera (1) 11 (step S137). The controller 15 then returns to step S132. The operation in steps S132 to S137 in FIG. 20 is performed frame by frame, for example.

In the embodiment, driving of the pan-and-tilt (1) 13 may be stopped while the pan-and-tilt base 76 is driven. The remainder of the configuration, operations and effects of the embodiment are similar to those of the fourth embodiment.

Figure 21:
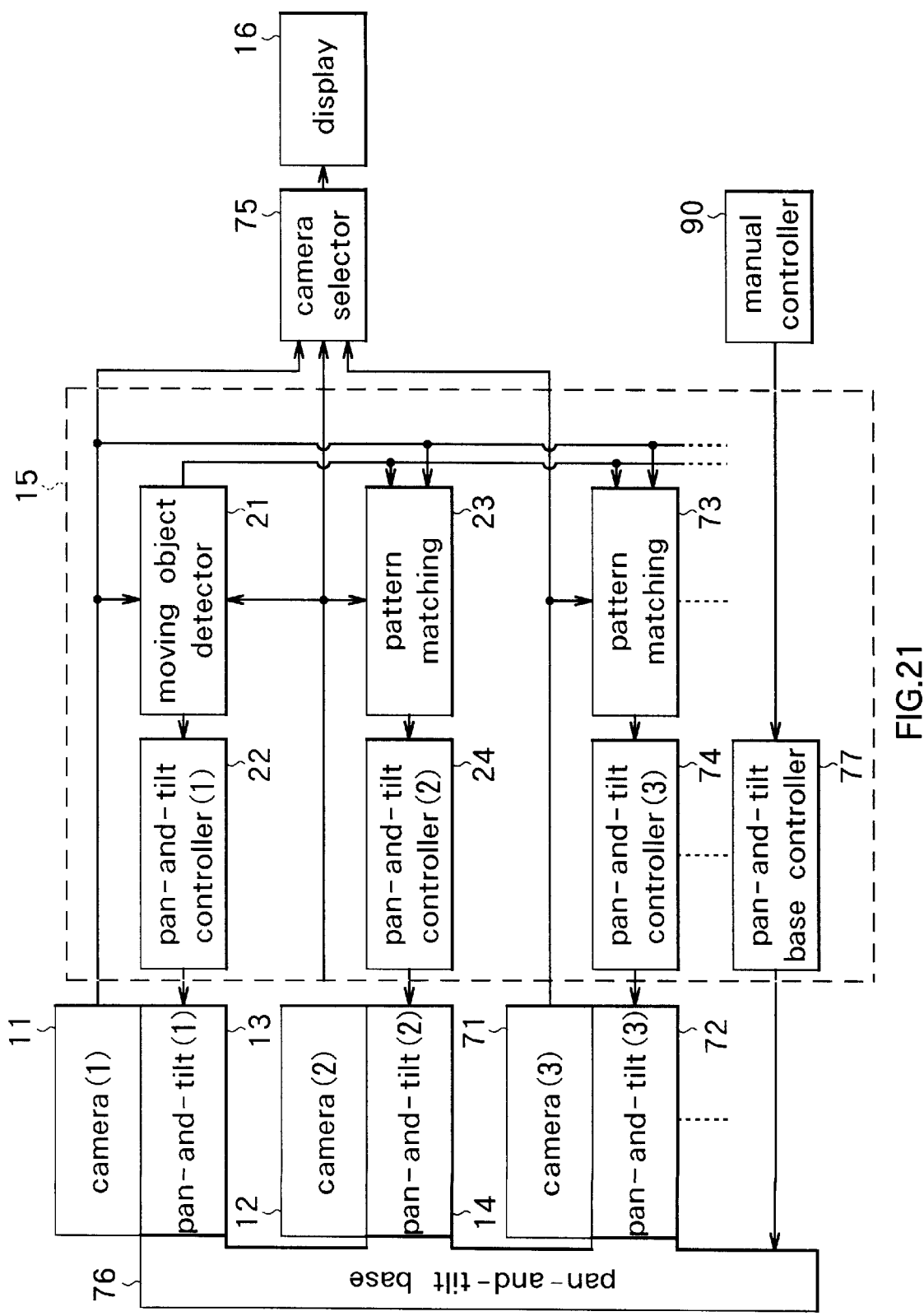
FIG. 21 is a block diagram of an apparatus for receiving and outputting three-dimensional image information of a seventh embodiment of the invention.

FIG. 21 is a block diagram of the apparatus for receiving and outputting three-dimensional image information of a seventh embodiment of the invention. In the apparatus of the seventh embodiment, the head sensor 80 and the head sensor controller 85 are excluded from the components of the sixth embodiment. Instead, a manual controller 90 is included for giving information for manual operation of the pan-and-tilt base 76 to the pan-and-tilt base controller 77.

According to the apparatus for receiving and outputting three-dimensional image information of the embodiment, the pan-and-tilt base 76 is driven by a user operating the manual controller 90. As a result, fields of view of the cameras 11, 12, 71, . . . are shifted to any direction in a unified manner. The remainder of the configuration, operations and effects of the embodiment are similar to those of the sixth embodiment.

The present invention is not limited to the embodiments described so far but may be practiced in still other ways within the scope of the invention. For example, a method such as sclera reflection may be used for directly detecting a direction of a line of vision of a viewer of an object of imaging for allowing the camera (1) 11 to track the direction of the line of vision. Image information obtained through the apparatus for receiving and outputting three-dimensional image information may be used not only for a three-dimensional image display but also for three-dimensional measurement and so on As described so far, the apparatus for receiving image information of the invention allows the plurality of field of view shifting means to individually shift each of the fields of view of the plurality of imaging means. The field of view follow-up control means controls the field of view shifting means corresponding to the second imaging means so that the field of view of the second imaging means follows the object of imaging of the first imaging means. As a result, three-dimensional image information is obtained with the plurality of imaging means following the object of imaging with a simple mechanism The apparatus for receiving image information of the invention may further comprise the automatic tracking control means for controlling the field of view shifting means corresponding to the first imaging means so that the field of view of the imaging means automatically tracks an object in motion of imaging. With this configuration the plurality of imaging means are allowed to follow an object in motion.

The apparatus for receiving image information of the invention may further comprise the unified shifting means for shifting the fields of view of the plurality of imaging means in a unified manner. The apparatus of the invention may further comprise the means for detecting a direction of a field of view of a viewer of the object of imaging and outputting a result of detection. The unified shifting control means may control the unified shifting means based on the result. With this configuration each field of view of the respective imaging means is allowed to follow the direction of the field of view of the person viewing the object of imaging.

The apparatus for receiving image information of the invention may further comprise the display means for displaying an image based on image signals outputted from the plurality of imaging means. The display means may display an image at a convergence angle in a range of 0 degree to 3 degrees inclusive. With this configuration a realistic three-dimensional image display is achieved with less fatigue of a viewer.

The method of receiving image information of the invention comprises: the tracking control step of controlling the field of view shifting means corresponding to the first imaging means so that the field of view of the first imaging means tracks an object of imaging; and the follow-up control step of controlling the field of view shifting means corresponding to the second imaging means so that the field of view of the second imaging means follows the object of imaging tracked by the tracking control step. As a result, the method allows three-dimensional image information to be obtained with the plurality of imaging means following the object of imaging with a simple mechanism.

The other method of receiving image information of the invention comprises: the first step of shifting a field of view of the first imaging means and a field of view of the second imaging means coarsely towards an object of imaging in a unified manner; the second step of shifting the field of view of the first imaging means so that the field of view of the first imaging means precisely track the object of imaging; and the third step of shifting the field of view of the second imaging means so that the field of view of the second imaging means follows the object of imaging tracked by the field of view of the first imaging means. As a result, the method allows three-dimensional image information to be obtained with the plurality of imaging means following the object of imaging with a simple mechanism.

Obviously many modifications and variations of the present invention are possible in the light of the above teachings. It is therefore to be understood that within the scope of the appended claims the invention may be practiced otherwise than as specifically described.

What is claimed is:

1. An apparatus for receiving image information comprising:

a plurality of imaging means including a first imaging means and at least one second imaging means other than said first imaging means for producing outputs;

a plurality of field of view shifting means each for individually shifting a field of view of each of said plurality of imaging means;

a field of view follow-up control means for controlling said field of view shifting means corresponding to said second imaging means so that the field of view of said second imaging means follows an object of imaging of said first imaging means; and a display means for displaying a stereographic image generated from the outputs of said plurality of imaging means; said display means displaying the image at a convergence angle in a range of 0 degree to 3 degrees inclusive.

* * * * *